US006778713B1

(12) United States Patent
Yoshida et al.

(10) Patent No.: US 6,778,713 B1
(45) Date of Patent: Aug. 17, 2004

(54) IMAGE READING APPARATUS

(75) Inventors: Takashi Yoshida, Kanagawa (JP);
Takashi Yamamoto, Kanagawa (JP);
Shinichi Yorifuji, Saitama (JP)

(73) Assignees: Fuji Photo Film Co., Ltd., Kanagawa
(JP); Fuji Photo Optical Co., Ltd.,
Saitama (JP)

( * ) Notice: Subject to any disclaimer, the term of this patent is extended or adjusted under 35 U.S.C. 154(b) by 0 days.

(21) Appl. No.: 09/332,950

(22) Filed: Jun. 15, 1999

(30) Foreign Application Priority Data

Jun. 15, 1998 (JP) .......................................... 10-167389
Jun. 30, 1998 (JP) .......................................... 10-184945

(51) Int. Cl.[7] ................................................. G05K 7/00
(52) U.S. Cl. ........................ 382/312; 382/313; 382/317; 382/318; 382/319
(58) Field of Search ............................... 382/312, 318, 382/319, 313, 317; 355/45, 51, 55, 65, 72, 41, 35; 348/264; 358/475

(56) References Cited

U.S. PATENT DOCUMENTS

| 3,944,732 | A | * | 3/1976 | Kino ........................... 178/7.1 |
| 4,104,520 | A | * | 8/1978 | Lewis et al. .................... 378/29 |
| 4,286,864 | A | * | 9/1981 | Lysle et al. ................... 399/140 |
| 4,823,164 | A | * | 4/1989 | Masahiro et al. .............. 355/72 |
| 4,910,550 | A | * | 3/1990 | Ohashi et al. ................ 355/402 |
| 4,933,685 | A | * | 6/1990 | Asano et al. ................. 346/1.1 |
| 5,018,806 | A | * | 5/1991 | Nakajima .................... 359/205 |
| 5,110,792 | A | * | 5/1992 | Nakayama et al. ............. 505/1 |
| 5,292,620 | A | * | 3/1994 | Booth et al. ................. 430/290 |
| 5,338,580 | A | * | 8/1994 | Katagiri et al. .............. 427/575 |
| 5,402,514 | A | * | 3/1995 | Booth .......................... 385/130 |
| 5,418,765 | A | * | 5/1995 | Misawa et al. ........... 369/44.12 |
| 5,510,631 | A | * | 4/1996 | Saito et al. .................... 257/77 |
| 5,521,726 | A | * | 5/1996 | Zimmerman et al. ......... 359/42 |
| 5,657,408 | A | * | 8/1997 | Ferm et al. .................... 385/43 |
| 5,671,077 | A | * | 9/1997 | Imakawa et al. ........... 359/204 |
| 5,712,674 | A | * | 1/1998 | Doi ............................ 347/238 |
| 5,712,700 | A | * | 1/1998 | Nagaishi et al. .............. 355/35 |
| 5,712,705 | A | * | 1/1998 | Fattinger et al. ............ 356/354 |
| 5,754,277 | A | * | 5/1998 | Fujibayashi ................... 355/45 |

FOREIGN PATENT DOCUMENTS

| JP | 357172309 A | * 10/1982 | ............ G02B/7/26 |
| JP | 61-88249 A |   5/1986 | ........... G03B/27/52 |
| JP | 1-179036 A |   7/1989 | ........... G03B/27/70 |
| JP | 6-76948 U |  10/1994 | ........... G03B/27/32 |
| JP | 7-23347 U |   4/1995 | ........... G03B/27/62 |
| JP | 9-130544 A |   5/1997 | ........... G03B/27/50 |

* cited by examiner

Primary Examiner—Anh Hong Do
(74) Attorney, Agent, or Firm—Sughrue Mion, PLLC

(57) ABSTRACT

An image reading apparatus comprises: a light source for irradiating light to a photographic photosensitive material; an image forming optical system for forming reflected or transmitted light emitted from a photosensitive film into an image; a film carrier having a shape correspomding to various types of photographic films to be loaded from the outside and supporting the photosensitive film; and an optical waveguide being replaceably attached to a predetermined reference attachment position and having a shape corresponding to the type of photographic film. Furthermore, there are provided a withdrawing mechanism for moving the optical waveguide from the reference attachment position in the case of an incorrect combination of the shape of the film carrier and the shape of the optical waveguide, and a detecting mechanism therefor.

26 Claims, 17 Drawing Sheets

F I G. 3
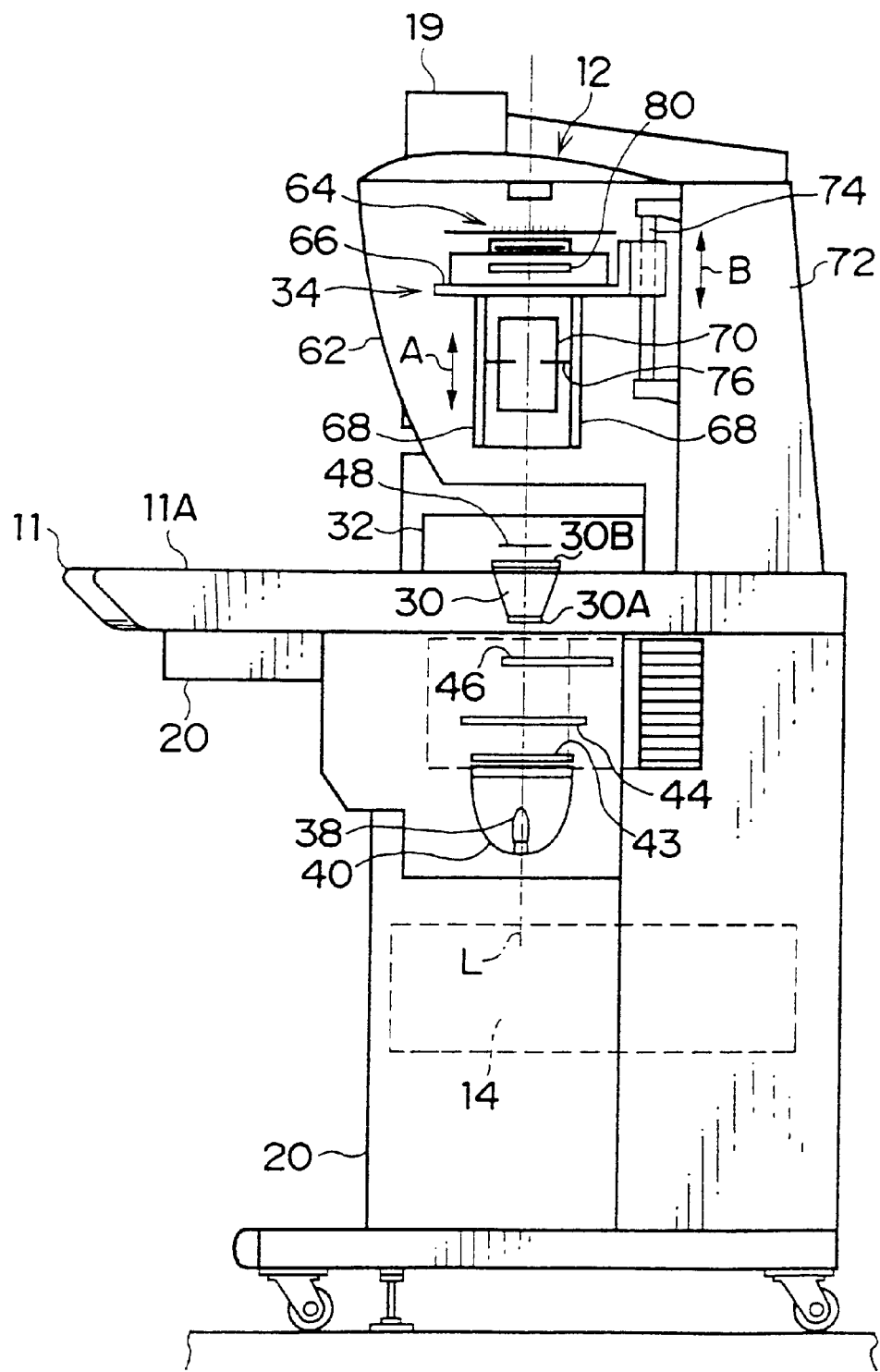

F I G. 1 2
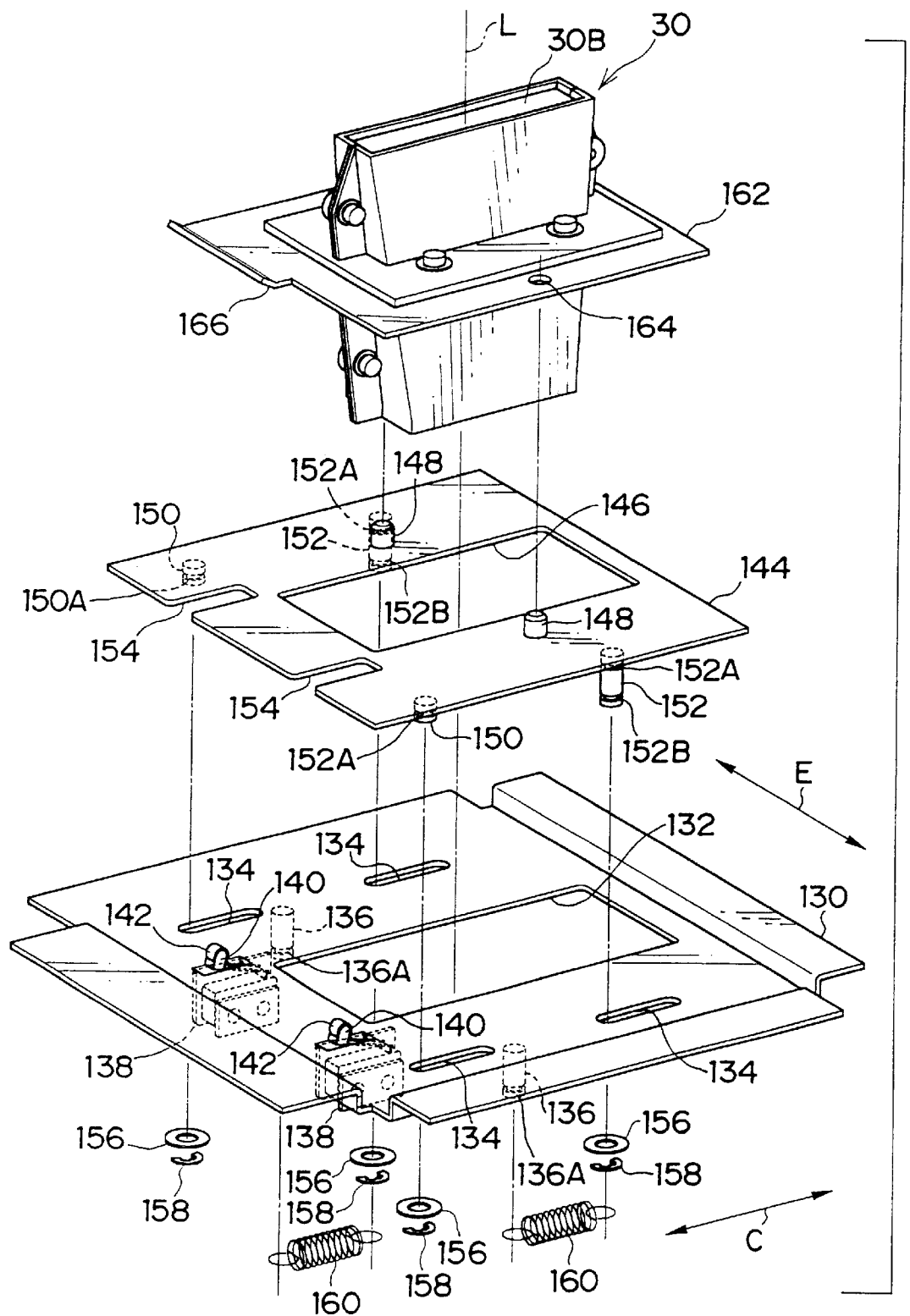

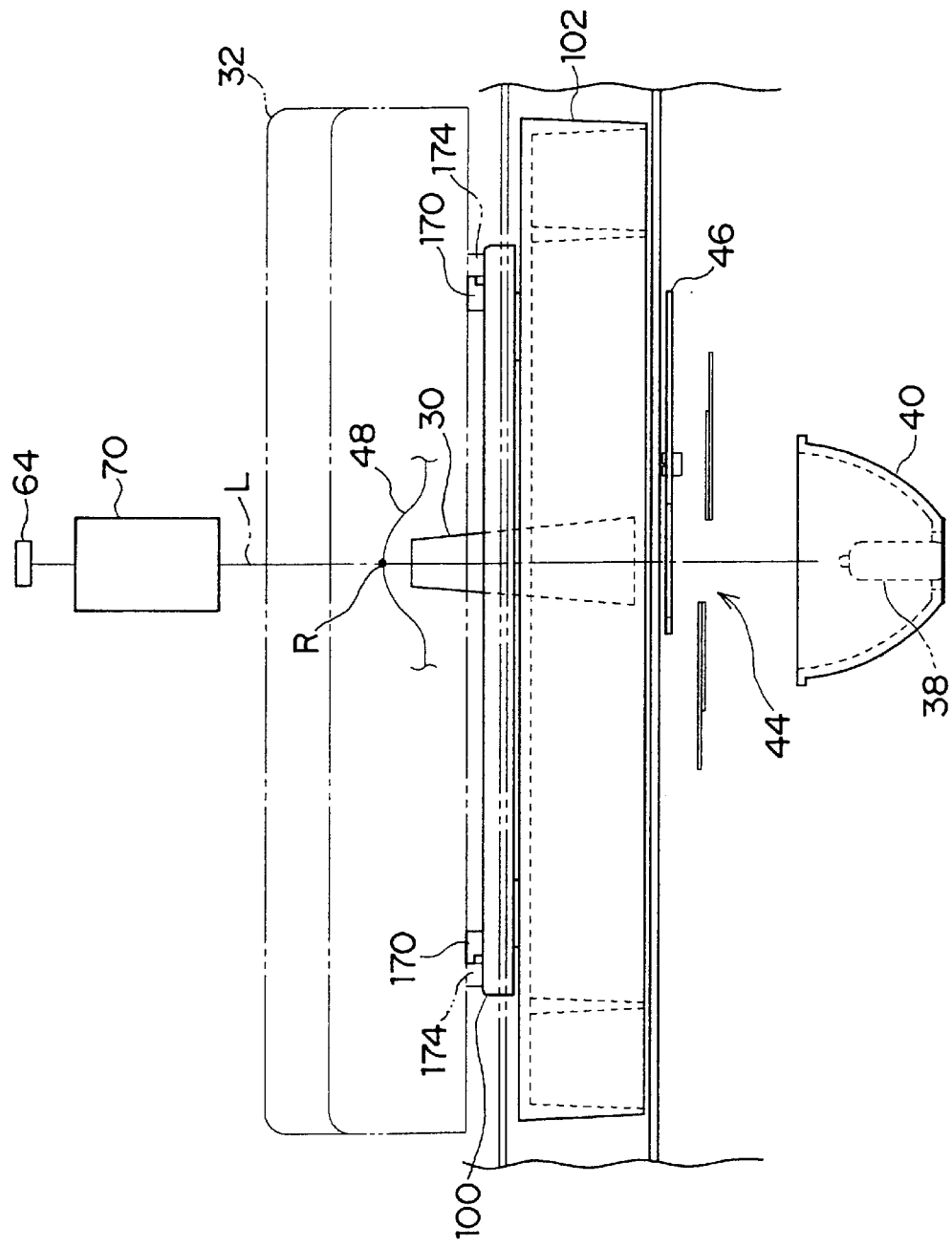

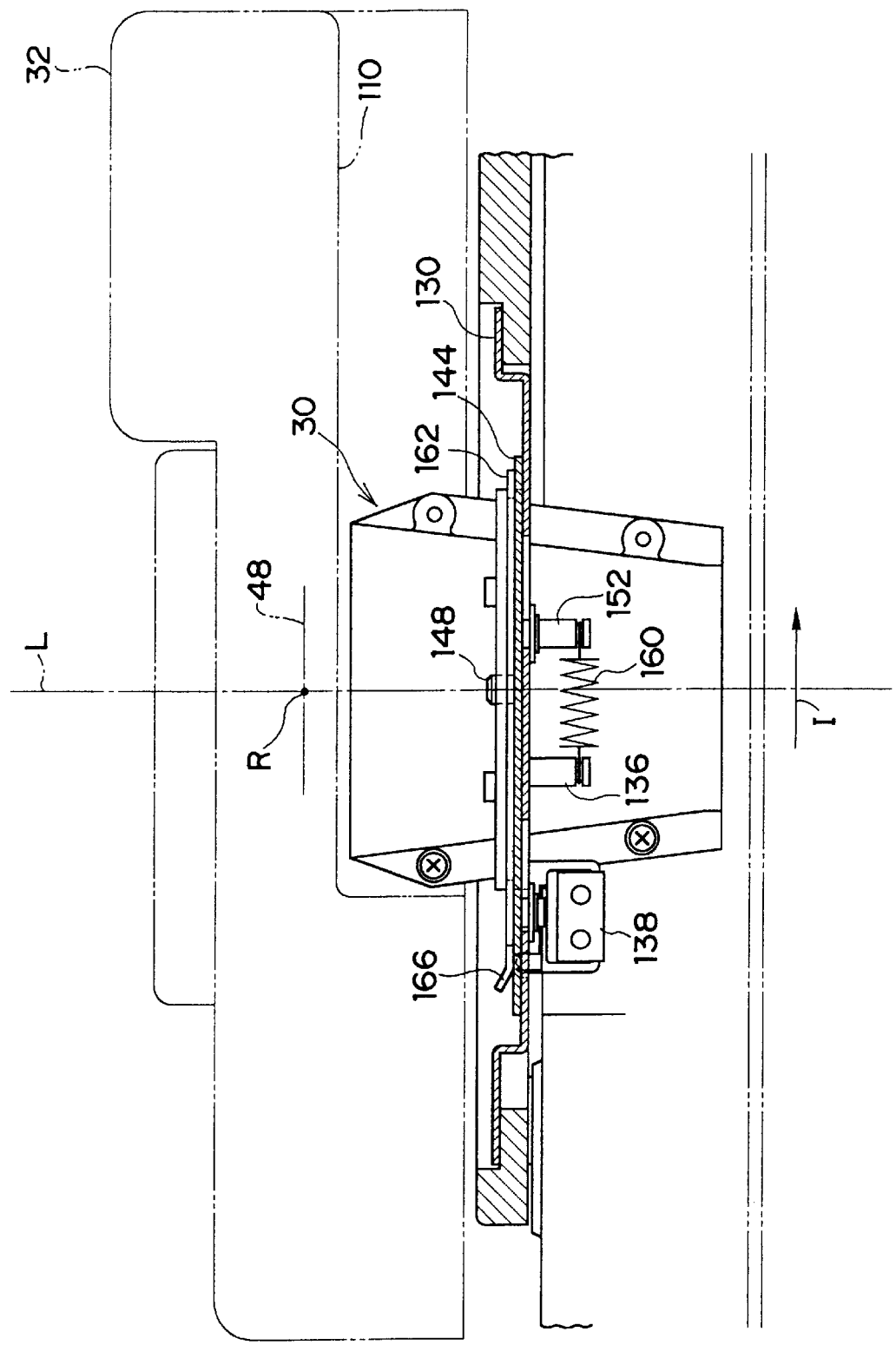

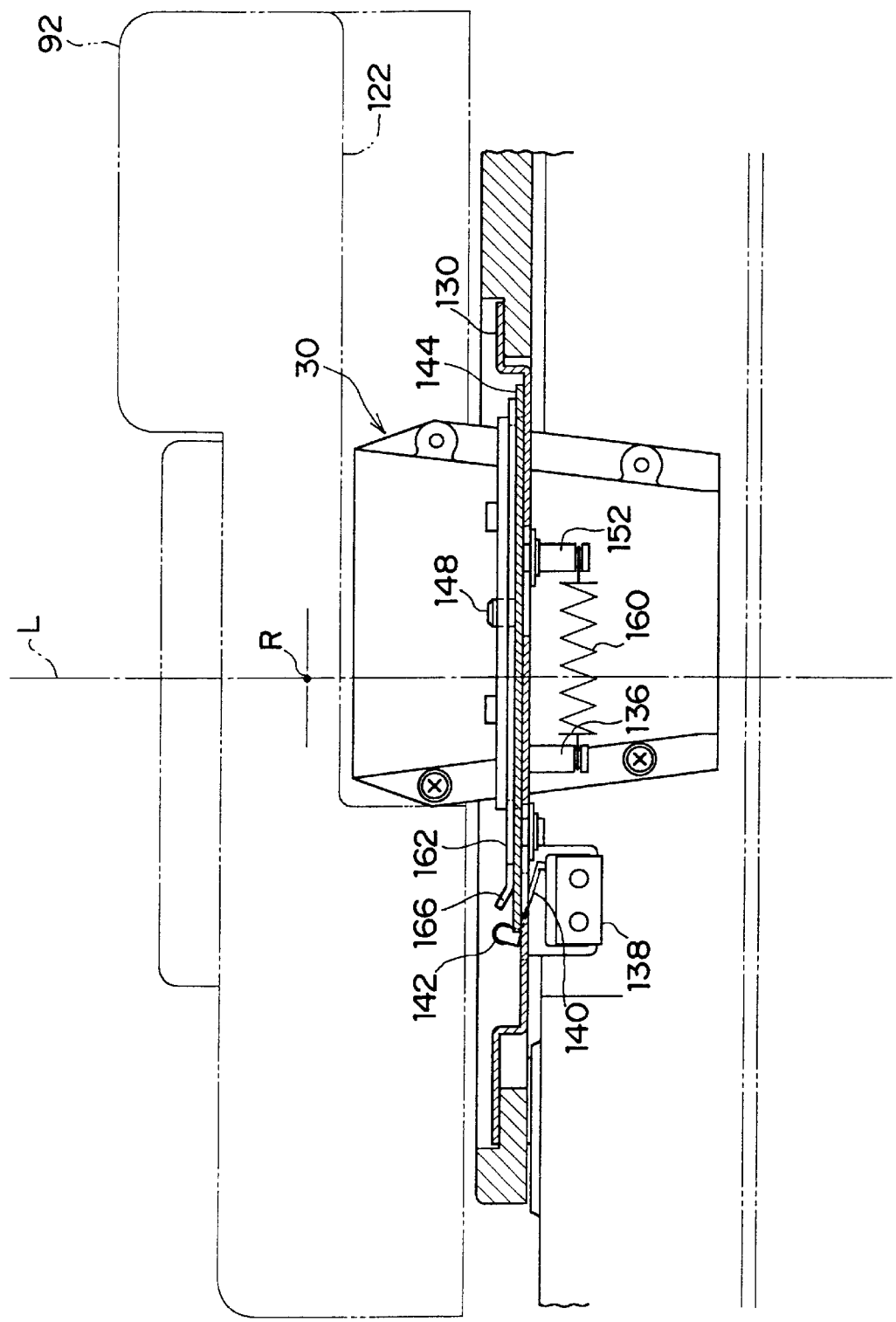

IMAGE READING APPARATUS

BACKGROUND OF THE INVENTION

1. Field of the Invention

The present invention relates to an image reading apparatus for reading an image recorded on a photographic film and, more particularly, to an image reading apparatus in which light is irradiated from a light source to a photographic film supported by a film carrier via an optical waveguide and an image can be read from a plurality of types of photographic films of different sizes or the like.

2. Description of the Related Art

In recent years, there have been proposed photographic processing methods in which a film image recorded on a photographic film is brokendown into component colors of red, green and blue, to be read, and then, the image data obtained by the reading is subjected to a variety of image processings such as correction, and the image then recorded on a recording material, displayed on a display unit, or the like. Some image reading apparatuses in which such photographic processing methods are implemented are provided with a film carrier, a mirror box and a lens unit. The film carrier is detachably disposed in the apparatus body and supports a photographic film loaded from the outside on an optical axis of the lens unit. The mirror box to be used in combination with the film carrier is previously disposed in the apparatus body. The mirror box includes an incident light portion and a light emitting portion connected via a waveguide, in which light incident into the incident light portion from a light source such as a halogen lamp is guided to the light emitting portion by the waveguide, and then, the light emitted from the light emitting portion is irradiated onto the photographic film which has been carried to a predetermined position by the film carrier. The lens unit is adapted to focus transmitted light or reflected light (hereinafter collectively referred to as transmitted light) from the photographic film on a reading sensor such as a line CCD (charge coupled device) or an area CCD, which photoelectrically converts the transmitted light which is formed in an image into an electric signal and outputs the electric signal corresponding to a film image.

Since in the above-described conventional image reading apparatus it is necessary to make the center beam of the transmitted light transmitting the film image of the photographic film accord with the optical axis of the lens unit constructed as an image forming optical system with a high degree of accuracy, the light source, the mirror box and the film carrier are disposed in such a manner that their positions are adjustable in a direction perpendicular to the optical axis of the lens unit (hereinafter referred to as an optical axis adjusting direction). Consequently, when the conventional image reading apparatus performs an optical axis adjusting operation to make the center beam of the transmitted light from the photographic film accord with the optical axis of the lens unit, the position of the mirror box is adjusted in the optical axis adjusting direction in such a manner as to make the center beam of scattered light emitted from the light emitting portion of the mirror box accord with the optical axis of the lens unit. The position of the light source is then adjusted in the optical axis adjusting direction in such a manner as to maximize the amount of the light incident on the mirror box and to minimize illumination unevenness, and further, the position of the film carrier is adjusted in the optical axis adjusting direction in such a manner that the optical axis of the lens unit passes through the center of an image recorded region (frame) of the photographic film.

Moreover, the above-described photographic processing method of the image reading apparatus has the advantage of giving free control of the quality of an image to be recorded by image processing of the image data in comparison with the conventional photographic processing method in which a film image is recorded on photographic paper by surface exposure.

Some of the image reading apparatuses, in which the above-described photographic processing methods are implemented, may be provided with a film carrier detachably disposed in the apparatus body so as to hold a photographic film, and an optical waveguide for guiding light emitted from the light source to the photographic film held by the film carrier. The shape and a structure of the film carrier are determined according to the type of photographic film. The film carrier is detachably disposed in a film carrier supporting portion provided at the main body of the image reading apparatus, and a photographic film is loaded in the film carrier. Here, the film carrier supporting portion can support any film carrier corresponding to the type of photographic film in order to facilitate operation of changing the type of photographic film from which an image is read. The shape and structure of the optical waveguide are also determined according to the type of photographic film. The optical waveguide corresponding to the type of photographic film with an image to be read recorded thereon is replaceably fixed at the main body of the image reading apparatus. Consequently, a film carrier and optical waveguide which both corepond to the same type of photographic film must always be used in combination.

In the case where in the conventional image reading apparatus either one of the mirror box and the film carrier is displaced from the optical axis of the lens unit after the optical axis adjusting operation, the positions of the mirror box, the light source and the film carrier must be adjusted in sequence. Therefore, the conventional image reading apparatus first encounters the problem that the optical axis adjusting operation has a large number of processes and is cumbersome.

Second, in the case where in the conventional image reading apparatus the type of photographic film for which the film carrier is suited is different from that for which the optical waveguide is suited, i.e., in the case where the optical waveguide previously fixed at the main body of the image reading apparatus is erroneously combined with the film carrier disposed in the film carrier supporting portion, the image recorded on the photographic film cannot be read correctly, and further, the apparatus may be broken. Particularly, since the optical waveguides composed of the mirror box and the like suitable for any type of photographic film are formed in a similar extarnal shape, there is a possibility that the film carrier may be disposed in the film carrier supporting portion without the fact that the optical waveguide has been attached in an erroneous combination to the main body of the image reading apparatus being noticed.

SUMMARY OF THE INVENTION

In consideration of the above-described problems, a first object of the present invention is to provide a light amount adjusting device in which an optical axis adjusting operation for an optical waveguide and a film carrier can be simplified with respect to an optical axis of an image forming optical system.

Furthermore, in consideration of the above-described problems, a second object of the present invention is to provide an image reading apparatus which can be prevented from being broken if an optical waveguide previously fixed to the apparatus and a film carrier to be disposed in a film carrier supporting portion are incorrectly combined, and further, which can inform an operator of the incorrect combination of the optical waveguide previously fixed to the apparatus and the film carrier to be disposed in the film carrier supporting portion.

In order to attain the aforementioned first object, the image reading apparatus according to the present invention comprises: a light source for irradiating light onto a photographic photosensitive material; an image forming optical system for forming reflected or transmitted light from the photographic photosensitive material into an image; a film carrier for supporting the photographic photosensitive material loaded from the outside; an optical waveguide for guiding the light, which is incident on an incident light portion from the light source, to a light emitting portion, and irradiating the light from the light emitting portion onto the photographic photosensitive material supported by the film carrier in such a manner that the reflected or transmitted light from the photographic photosensitive material is incident into the image forming optical system; and a supporting/positioning member interposed between the light source and the image forming optical system, for supporting the film carrier and the optical waveguide.

In the image reading apparatus having the above-described configuration, both the film carrier and the optical waveguide are supported by the supporting/positioning member, thus suppressing a relative displacement of either one of the film carrier and the optical waveguide disposed in the supporting/positioning member from the other. Consequently, after the positions of the film carrier and the optical waveguide together with the supporting/positioning member are adjusted to respective predetermined positions on the optical axis of the image forming optical system, it is possible to suppress a displacement of only one of the film carrier and the optical waveguide from the optical axis of the image forming optical system. Furthermore, it is possible to restrict the displacement of the film carrier or the optical waveguide to a slight amount in the case where only one of the film carrier and the optical waveguide is displaced from the optical axis of the image forming optical system.

If the supporting/positioning member is moved in the direction perpendicular to the optical axis, the film carrier and the optical waveguide together with the supporting/positioning member are moved integrally with each other without any change in the relative position thereof. Consequently, the positions of the film carrier and the optical waveguide can be adjusted at the same time just by the position adjusting operation of the supporting/positioning member, thereby simplifying the optical axis adjusting operation for adjusting the positions of the film carrier and the optical waveguide to their respective predetermined positions on the optical axis of the image forming optical system.

Here, although the supporting/positioning member may have either an integral structure or an assembed structure composed of a plurality of component parts capable of being disassembled, the supporting/positioning member must be able to position the film carrier and the optical waveguide at the respective predetermined positions with the required accuracy, and must have the dimensional accuracy and sufficient strength to prevent any displacement of the film carrier and the optical waveguide after positioning. The image forming optical system forms reflected light or transmitted light from a photographic film into an image on a sensing portion of a reading sensor such as a CCD (charge couple device) image sensor or on photographic paper. At this time, the reading sensor or the photographic paper is positioned in advance at a predetermined position on the optical axis of the image forming optical system. Consequently, if the reflected light or transmitted light from the photographic film is not incident on a predetermined incident position of the image forming optical system, a deviation may be generated in an image point in the image forming optical system, whereby a normal reproduced image cannot be obtained.

The image reading apparatus according to the present invention may preferably comprise movable supporting means for supporting the supporting/positioning member in such a manner that the position of the supporting/positioning member can be adjusted in a direction perpendicular to the optical axis of the image forming optical system.

In the image reading apparatus having the above-described configuration, the movable supporting means supports the supporting/positioning member in such a manner as to adjust the position of the supporting/positioning member in the direction perpendicular to the optical axis of the image forming optical system. Therefore, if the relative position of the film carrier and the optical waveguide are adjusted in advance on the supporting/positioning member to a predetermined positional relationship, the film carrier and the optical waveguide can be adjusted to their respective predetermined positions on the optical axis of the image forming optical system at the same time simply of the position adjusting operation of the supporting/positioning member of the movable supporting means without independent positional adjustment of the film carrier and the optical waveguide, thus simplifying the optical axis adjusting operation with respect to the film carrier and the optical waveguide.

In the image reading apparatus according to the present invention, it is preferable that the optical waveguide and the film carrier should be detachably disposed in the supporting/positioning member.

In the image reading apparatus having the above-described configuration, the film carrier and the optical waveguide are detachably disposed in the supporting/positioning member, thereby simplifying the operation of replacing the film carrier and the optical waveguide. Furthermore, if the supporting/positioning member, the optical waveguide and the film carrier have sufficiently high dimensional accuracy within the positioning error allowable at the time of optical axis adjustment, it is possible to suppress a change in the relative positions of either one of the film carrier and the optical waveguide to the other to a slight level even after the replacement of the film carrier and the optical waveguide in the supporting/positioning member, thus dispensing with the independent position adjusting operation of the film carrier and the optical waveguide after the replacement.

Namely, it is necessary to use a special film carrier and a special optical waveguide exclusive to the type of photographic film. If the type of photographic photosensitive material (photographic film) for reading an image is changed, the optical waveguide and the film carrier already disposed in the supporting/positioning member are detached, and then, a film carrier and an optical waveguide exclusive to the type of photographic film must then be disposed in the supporting/positioning member. However, according to the present invention, it is possible to reduce the time required for the replacing operation of the film carrier and the optical waveguide.

Here, the term photographic film refers to a film in which a negative or positive image becomes visualized after an object is photographed, followed by development. The types of photographic film include, for example, a photographic film of a 135 size, a photographic film of 110 size, a photographic film with a transparent magnetic layer formed thereon (i.e. a photographic film of 240 size, known as an APS film) and photographic films of 120 and 220 sizes (Brownie sizes). These films are different in the film width in the transverse direction thereof, in the shape of the image recording region, in size, and in structure. Therefore, the film carrier and the optical waveguide must have the structure and shape to correspond to the type of photographic film.

In order to attain the aforementioned second object, the image reading apparatus according to the present invention can read images from a plurality of types of photographic films, and further, the image reading apparatus comprises:

a film carrier, having a shape corresponding to the type of photographic film, for holding the photographic film;

a film carrier supporting portion, in which the film carrier is detachably disposed, for positioning the photographic film held by the film carrier at a predetermined reading position;

an optical waveguide being replaceably fixed to a predetermined reference fixing position and having a shape corresponding to the type of photographic film, for irradiating light emitted from a light source onto the reading position; and a retracting means for moving the optical waveguide from the reference fixing position by pressing force of the film carrier disposed in the film carrier supporting portion in the case where the shapes of the film carrier and the optical waveguide are not suited for the type of photographic film.

In the image reading apparatus having the above-described configuration, in the case where the film carrier and the optical waveguide for the different types of photographic films are provided, i.e., in the case where the film carrier and the optical waveguide are combined incorrectly, the retracting means is pressed by the film carrier disposed in the film carrier supporting portion, so that the optical waveguide is moved from the reference fixing position. Consequently, it is possible to prevent a heavy load from acting on the film carrier and the optical waveguide even if the film carrier disposed in the film carrier supporting portion abuts against the optical waveguide or the like. Thus, it is possible to prevent any breakage of the film carrier, the optical waveguide and the members on which the load is exerted via the film carrier or the optical waveguide.

Here, the retracting means receives directly or indirectly the pressurizing force from the film carrier disposed in the film carrier supporting portion, to thus move the optical waveguide and/or its supporting portion in a direction retracting from the film carrier in the case of the incorrect combination of the film carrier and the optical waveguide.

In the image reading apparatus according to the present invention, the retracting means may preferably comprise:

an urging member for urging the optical waveguide moved by the pressing force of the film carrier in the direction of the reference attachment position; and a stopper member for stopping the optical waveguide moved by urging force of the urging member at the reference attachment position when the film carrier is detached from the film carrier supporting portion.

In the image reading apparatus having the above-described configuration, the optical waveguide is moved by the film carrier disposed in the film carrier supporting portion in the case of the incorrect combination of the film carrier and the optical waveguide. However, when the film carrier is detached from the film carrier supporting portion, the optical waveguide is automatically returned to the reference fixing position, thus dispensing with a returning operation for returning the film carrier moved in the retracting direction to the reference fixing position.

The image reading apparatus according to the present invention may preferably comprise a retract detecting means for detecting that the optical waveguide is moved by the pressing force of the film carrier.

In the image reading apparatus having the above-described configuration, when the optical waveguide is moved by the pressing force of the film carrier, this fact is detected by the retract detecting means. Consequently, an alarm can be output during the detection by the retract detecting means. This alarm can inform an operator or the like of the incorrect combination of the film carrier and the optical waveguide when the film carrier is disposed in the film carrier supporting portion. Moreover, it is possible to interlock-control the apparatus in such a manner as not to perform reading of the photographic film during the detection by the retract detecting means, so as to prevent any reading of the photographic film in the case of the incorrect combination of the film carrier and the optical waveguide.

Here, the retreat detecting means is constituted of, e.g., a micro switch or a photoelectric or magnetic proximity sensor, and is adapted to detect the movement of the optical waveguide in the retracting direction: it is configured such that it is turned on by the optical waveguide located at the reference fixing position while it is turned off when the optical waveguide is separated from the reference fixing position; or it is turned off when the optical waveguide is located at the reference fixing position while it is turned on by the optical waveguide moved from the reference fixing position toward the retracting direction. Furthermore, the alarm output during the detection by the retract detecting means includes means by the use of sound generated by a buzzer or the like, light by a lamp or the like, or characters, symbols or images displayed on a display or the like.

BRIEF DESCRIPTION OF THE DRAWINGS

FIG. 3 is a side cross-sectional view showing the image reading apparatus shown in FIG. 1.

FIG. 12 is an exploded perspective view showing the mirror box and a mirror box attaching/detaching portion in the supporting/positioning plate in the image reading apparatus shown in FIG. 1.

FIG. 15 is a front view particularly showing the members disposed along the optical axis L of the lens unit in the image reading apparatus in the present embodiment.

FIG. 16 is a cross-sectional view showing the mirror box held at a reference fixing position and the fixing mechanism of the mirror box taken along a line XVI—XVI of FIG. 13.

FIG. 17 is a cross-sectional view showing the mirror box moved from the reference fixing position and the fixing mechanism of the mirror box taken along a line XVII—XVII of FIG. 13.

DESCRIPTION OF THE PREFERRED EMBODIMENTS

A preferred embodiment according to the present invention will be explained below in reference to the drawings.

Figure 1:
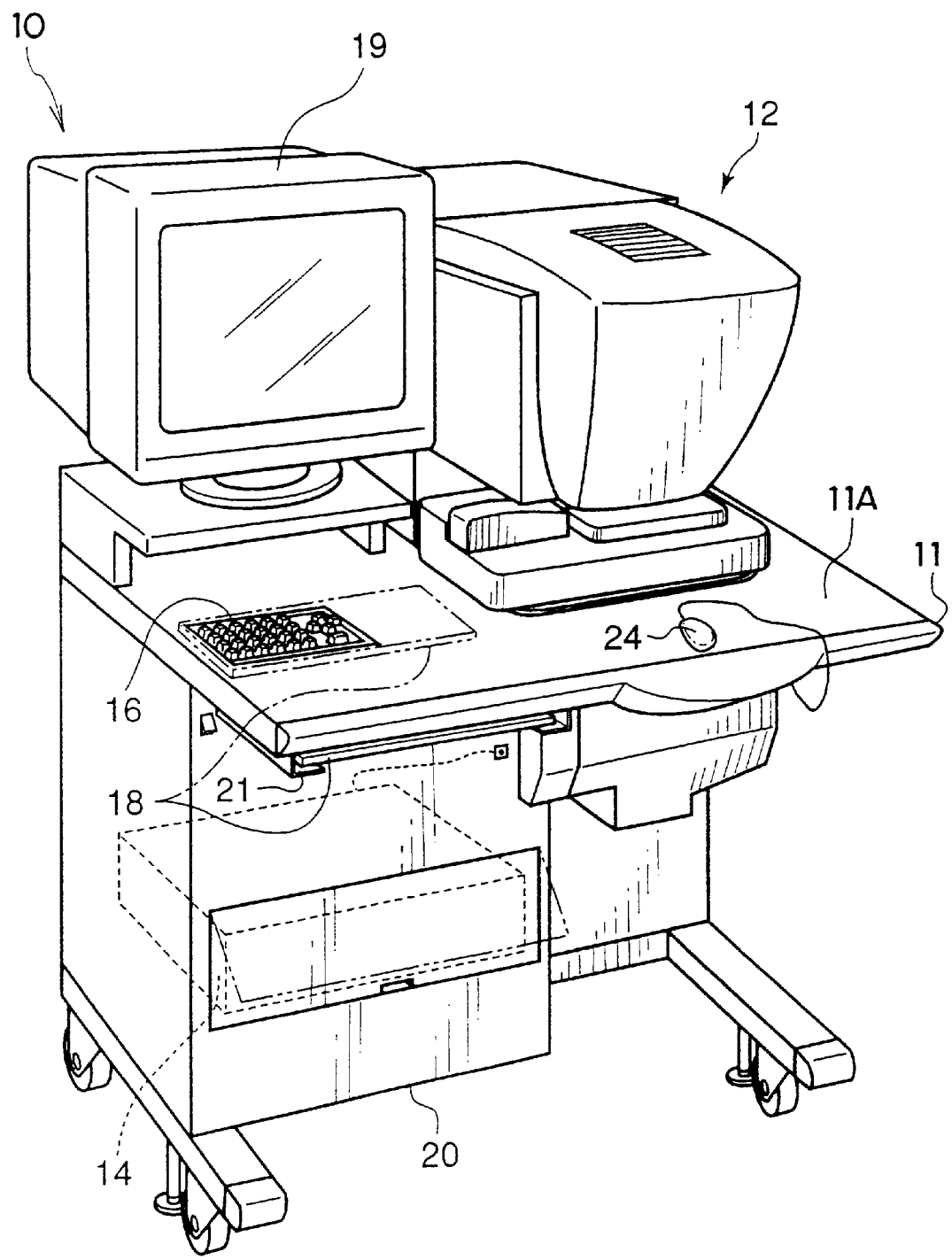
FIG. 1 is a perspective view showing an image reading apparatus in a preferred embodiment according to the present invention.

Referring to FIGS. 1 to 5, a description will be given of the schematic configuration of an image reading apparatus in a preferred embodiment in order to attain the first object of the present invention. As shown in FIG. 1, the image reading apparatus 10 in this embodiment comprises a working table 11, a line CCD scanner 12 and an image processing unit 14. The working table 11 is provided with an upper surface serving as a working surface 11A, two types of keyboards 16 and 18 disposed therein, and a display 19 mounted thereon. Here, the keyboard 16 is embedded in the working table 11 in such a manner that the upper surface having keys arranged thereon is exposed to and above the working surface 11A. The other keyboard 18 is contained inside a drawer 21 disposed slidably under the working surface 11A during non-use while it is taken out of the drawer 21 and mounted on the working surface 11A during use. The image reading apparatus includes a casing-like container unit 20 under the working table 11. The image processing unit 14 is contained inside the container unit 20. To the image processing unit 14 are connected the keyboards 16 and 18 and a mouse 24 via connecting cables.

The line CCD scanner 12 is adapted to read a film image recorded on a photographic film such as a negative film or a reversal film, and specifically, to read film images recorded on, for example, photographic films of 135 and 110 size, a photographic film having a transparent magnetic layer formed thereon (a photographic film of 240 size, i.e., a so-called APS film), and photographic films of 120 and 220 size (i.e., Brownie size). In the line CCD scanner 12, a line CCD reads a film image to be read, and then, image data is output to the image processing unit 14. Upon receipt of the image data output from the line CCD scanner 12, the image processing unit 14 performs a variety of image processings such as correction with respect to the image data, to thus form recording image data, and then, outputs the data to a laser printer, not shown.

Figure 2:
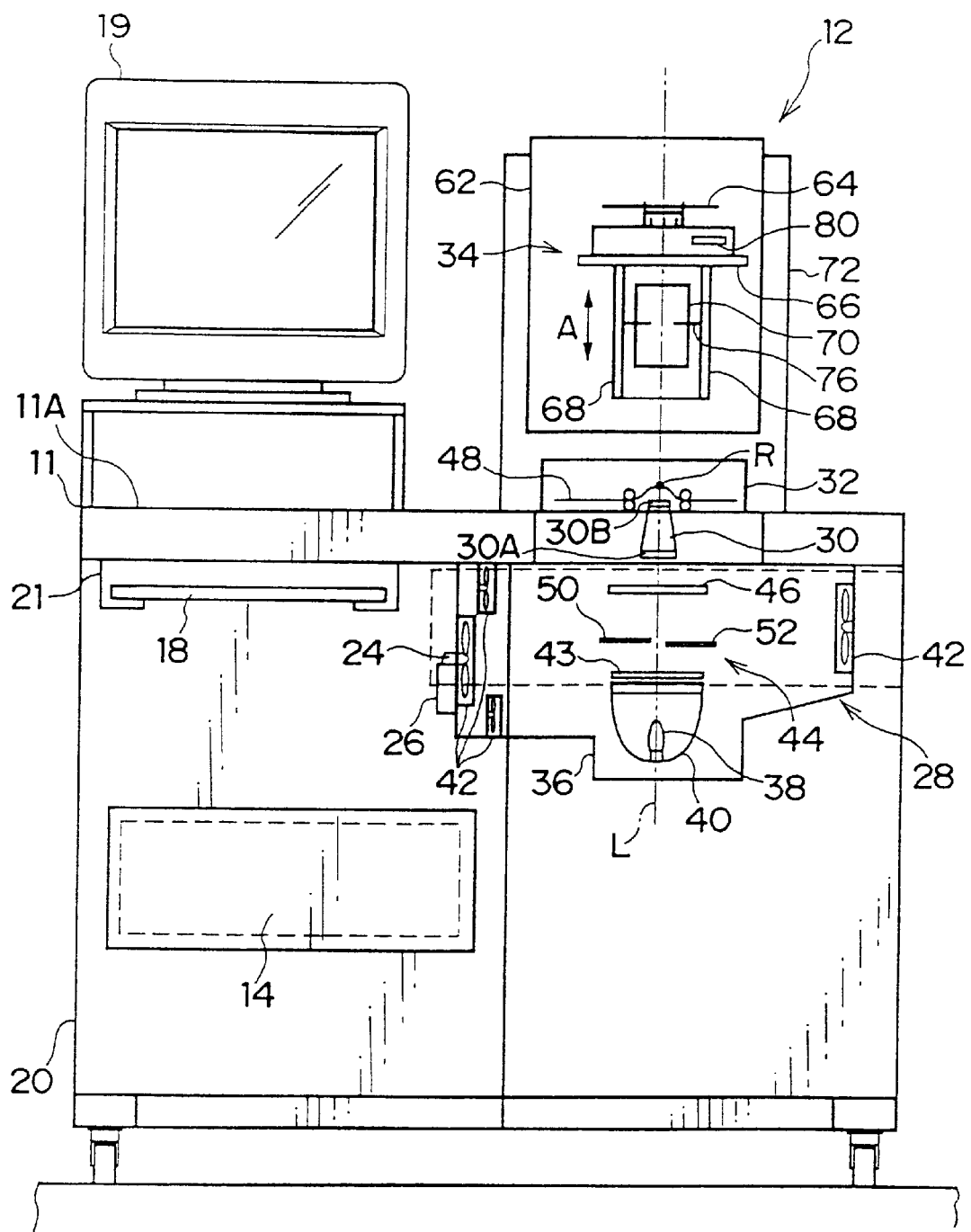
FIG. 2 is a front cross-sectional view showing the image reading apparatus shown in FIG. 1.

As shown in FIGS. 2 and 3, the line CCD scanner 12 comprises: a light source unit 28 disposed under the working table 11; a mirror box 30 supported by the working table 11; a film carrier 32 detachably disposed above the mirror box 30; and a reader unit 34 disposed on a side opposite to the light source unit 28 with the working table 11 held between the light source unit 28 and the same.

The light source unit 28 includes a lamp 38 such as a halogen lamp or a metal halide lamp, a reflector 40, and a metallic casing 36 containing the lamp 38 and the reflector 40 therein. The reflector 40 is formed in a substantially semi-spherical concave serving as a light reflecting surface, which supports the lamp 38 in an enveloped manner. Part of the light emitted from the lamp 38 is reflected by the reflector 40 toward a predetermined direction. A plurality of fans 42 are provided sideways of the casing 36 in the light source unit 28. These fans 42 are actuated during lighting of the lamp 38, to allow air to circulate in the casing 36, thereby preventing any overheat inside the casing 36.

Figure 4A:
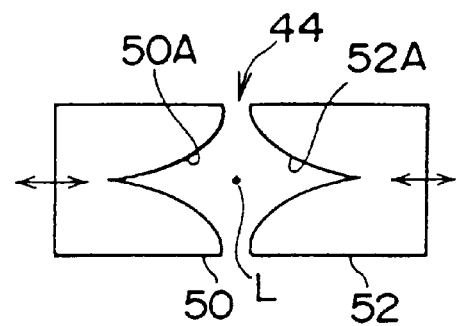
FIG. 4A is a plan view showing one example of a diaphragm plate in the image reading apparatus shown in FIG. 1.

Inside the casing 36, an UV/IR cut filter 43, a light source diaphragm 44 and a turret 46 are disposed in this order from the lamp 38 along an optical axis L of the light emitted from the lamp 38. The UV/IR cut filter 43 is adapted to cut light of wavelengths outside of ultraviolet ray and infrared ray regions of the emitted light so as to prevent any chemical change of a photographic film 48 and prevent any increase in temperature, thus enhancing reading accuracy. The light source diaphragm 44 is formed of a pair of diaphragm plates 50 and 52, as shown in FIG. 4A. The pair of diaphragm plates 50 and 52 are supported on the plane perpendicular to the optical axis L by guide rails (not shown) in such a manner as to be freely moved in one direction perpendicular to the optical axis L and be disposed with the optical axis L held therebetween. Substantially V-shaped cutouts 50A and 52A are formed from one end on the side of the optical axis L to the other end in the moving direction in the pair of diaphragm plates 50 and 52, respectively. Consequently, when the pair of diaphragm plates 50 and 52 are moved toward the optical axis L in a direction approaching each other from the position shown in FIG. 4A, a substantially rhombic aperture is formed on the optical axis L. The light source diaphragm 44 is adapted to bring the pair of diaphragm plates 50 and 52 into approach to or separation from each other with respect to the optical axis L so as to change the area of the aperture and adjust an amount of the reading light incident into the photographic film 48.

Figure 4B:
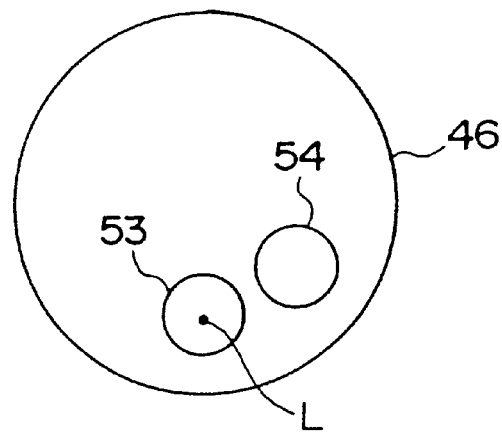
FIG. 4B is a plan view showing one example of a turret in the image reading apparatus shown in FIG. 1.

The disk-like turret 46 is rotatably supported by a strut parallel to the optical axis L. As shown in FIG. 4B, in the turret 46 are embedded a balance filter 53 for a negative film and a balance filter 54 for a reversal film in which color components of the light reaching the photographic film 48 and the reader unit 34 are appropriately set according to the type of photographic film 48 (i.e., a negative film or a reversal film). In the turret 46, either one of the balance filters 53 and 54 (the balance filter 53 in FIG. 4B is supported on the optical axis L.

Figure 5:
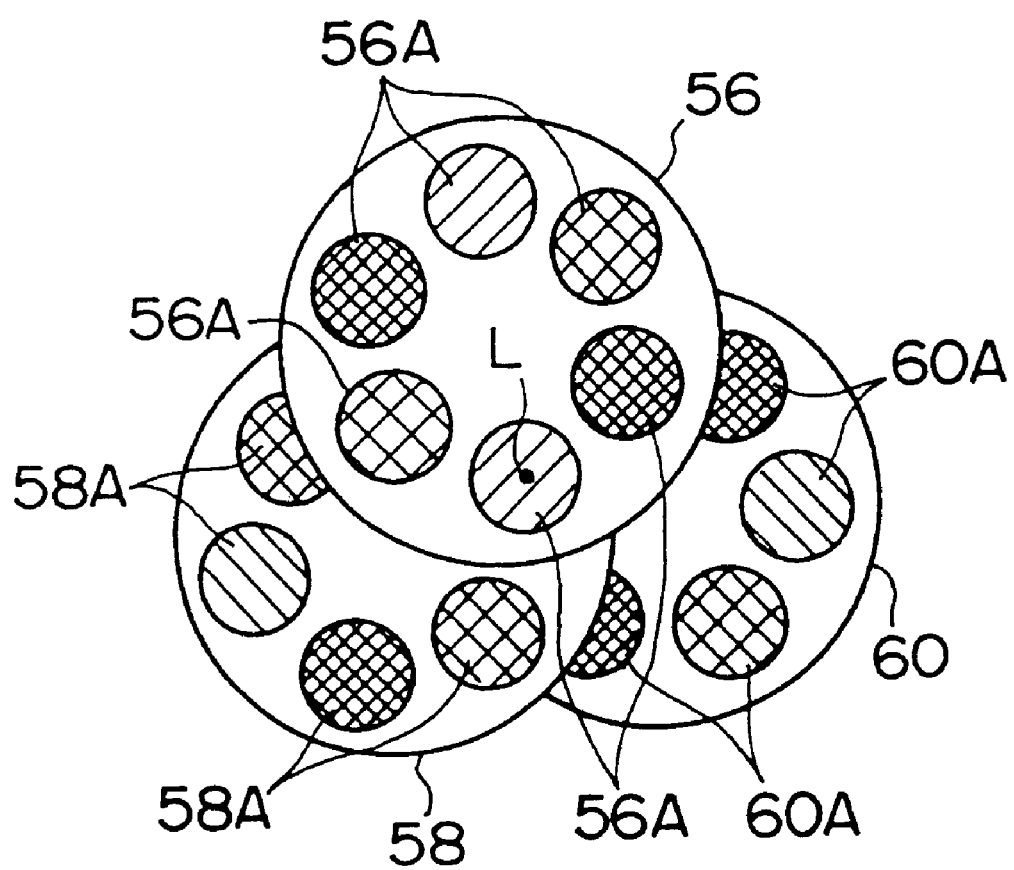
FIG. 5 is a plan view showing another example of a turret applicable to the image reading apparatus shown in FIG. 1.

Incidentally, in place of the single turret 46 as described above, the image reading apparatus 10 may be provided with a turret 56 for cyan filters for absorbing red light, a turret 58 for magenta filters for absorbing green light, and a turret 60 for yellow filters for absorbing blue light in superposition, as shown in FIG. 5. Here, the turret 56 has a plurality of cyan filters 56A (six in FIG. 5) of different concentrations embedded therein. Like the turret 56, a plurality of magenta filters 58A and yellow filters 60A are embedded in the turrets 58 and 60, respectively. The positions of the turrets 56, 58 and 60 are controlled in a rotating direction in such a manner that respective ones selected from the filters 56A, 58A and 60A are superposed on the optical axis L.

The mirror box 30 is configured as an optical waveguide for introducing the light transmitting through the UV/IR cut filter 43, the light source diaphragm 44 and the turret 46 to a reading position R. The mirror box 30 is formed into a shape which becomes shorter in a feeding direction of the photographic film 48 fed by the film carrier 32 upward, i.e., nearer the photographic film 48 (see FIG. 2) while becoming longer in a film width direction perpendicular to the feeding direction (see FIG. 3). Light diffusing plates 30A and 30B are disposed at the lower and upper surfaces supported on the optical axis L in the mirror box 30, wherein the light diffusing plate 30A serves as a light incident portion while the light diffusing plate 30B serves as a light emitting portion. The entire inner wall of the mirror box 30 is constituted of a mirror, and a space defined between the light diffusing plates 30A and 30B serves as the optical waveguide. Consequently, the mirror box 30 changes the light incident into the light diffusing plate 30A serving as the light incident portion into slit light, in which the width direction of the photographic film 48 is used as a longitudinal direction, to be emitted from the light diffusing plate 30B serving as the light emitting portion, and further, into diffused light via the light diffusing plates 30A and 30B so as to irradiate the light to the photographic film 48 carried to the reading position R by the film carrier 32. In this way, the light emitted from the mirror box 30 is changed into the diffused light, thereby reducing variations in amount of the light irradiated to the photographic film 48 so as to irradiate a uniform amount of the slit light to the film image. Moreover, even if there is a flaw on the film image on the photographic film 48, such a flaw becomes inconspicuous. Many types of mirror boxes 30 are prepared according to the types of photographic films 48, and therefore, are selected according to the type of photographic film 48. Although the mirror box 30 and the film carrier 32 shown in FIGS. 2 and 3 are applicable to the photographic film of a 135 size, mirror boxes and film carriers of shapes or the like different from those of the mirror box 30 and the film carrier 32 are prepared exclusively for the other types of photographic films, respectively.

Slits (not shown) longer than the width of the photographic film 48 in the film width direction are formed at positions corresponding to the optical axis L at the upper and lower surfaces of the film carrier 32. The slit light emitted from the mirror box 30 is irradiated onto the photographic film 48 through the slit formed at the lower surface of the film carrier 32. The light transmitted through the photographic film 48 reaches the reader unit 34 through the slit formed at the upper surface of the film carrier 32.

Incidentally, roller pairs (see FIG. 2) for holding and feeding the photographic film 48 are disposed upstream and downstream of the reading position R in the film carrier 32. These roller pairs feed the photographic film 48 inside the film carrier 32 at a plurality of speeds according to a scanning type such as pre-scanning or fine scanning, the concentration of the film image, or the like.

As shown in FIGS. 2 and 3, the reader unit 34 is contained inside a casing 62 supported on the working table 11. A mount table 66 having a line CCD 64 mounted thereabove is housed inside the casing 62. A lens cylinder 68 extends downward from the lower surface of the mount table 66. Inside the lens cylinder 68 is contained a lens unit 70 in such a manner as to be freely moved in a direction near or apart from the working table 11 (a direction indicated by an arrow A) so as to vary a magnification such as reduction or enlargement. Therefore, the lens unit 70 is moved in the direction indicated by the arrow A, thus varying the magnification of the film image formed on the line CCD 64.

As shown in FIG. 3, a support frame 72 is erected at the working surface 11A of the working table 11. A guide rail 74 is disposed at the side surface of the support frame 72 in such a manner that its longitudinal direction is parallel to the optical axis L. The guide rail 74 is fitted to the end of the mount table 66, thus to movably support the mount table 66 in a direction (a direction indicated by an arrow B) parallel to the optical axis L. Consequently, it is possible to secure a conjugate length during the variation of magnifications and auto-focusing.

Figure 4C:
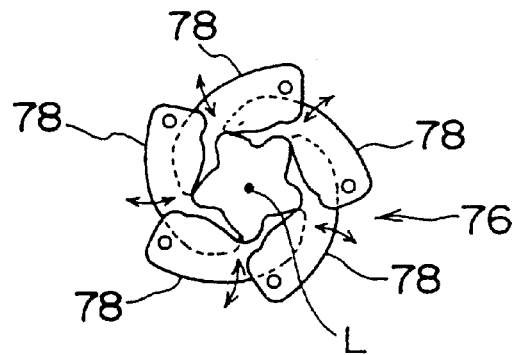
FIG. 4C is a plan view showing one example of a lens diaphragm in the image reading apparatus shown in FIG. 1.

The lens unit 70 includes a plurality of lenses and a lens diaphragm 76 interposed between the lenses. As shown in FIG. 4C, the lens diaphragm 76 is provided with a plurality of diaphragm plates 78 molded into a substantially C shape. The plurality of diaphragm plates 78 are arranged in a spiral manner on the optical axis L, in which one outer end of each of the diaphragm plates 78 with respect to the optical axis L is turnably supported by a pin. The plurality of diaphragm plates 78 are connected to each other via links, not shown, and therefore, are turned in the same direction when drive force of a lens diaphragm drive motor (not shown) is transmitted. The area of a substantially star-like aperture defined by the diaphragm plates 78 on the optical axis L is varied according to the turning movement of the diaphragm plates 78, so that an amount of the light transmitting the lens diaphragm 76 is varied.

In the line CCD 64, numerous photoelectric transducer elements such as CCD cells or photodiodes are aligned in the width direction of the photographic film 48, and further, three lines of sensing portions each having an electronic shutter mechanism are spaced in parallel to each other, in which any one of color separating filters for red, green and blue is fixed on a light incident side of each of the sensing portions (i.e., a so-called three-line color CCD). Numerous transfer portions are disposed in the vicinity of the sensing portions in a one-to-one fashion. Consequently, electric charges accumulated in the CCD cells of the sensing portions are transferred in sequence via the corresponding transfer portions.

Figure 4D:
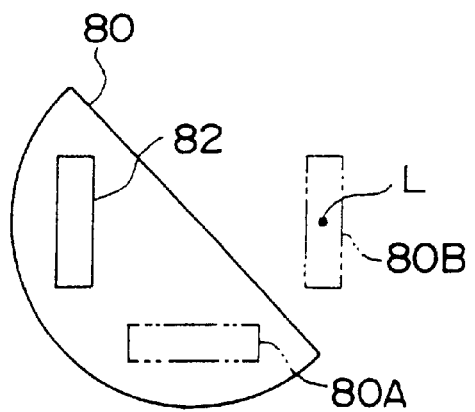
FIG. 4D is a plan view showing one example of a CCD shutter in the image reading apparatus shown in FIG. 1.

As shown in FIGS. 2 and 3, a CCD shutter 80 is disposed on a light incident side of the line CCD 64. An ND filter 82 is embedded in the CCD shutter 80, as shown in FIG. 4D. The CCD shutter 80 is rotatably supported and is switched in three states: the full closed state in which the light incident into the line CCD 64 is shut off for darkness correction while a light shutting-off portion 80A having no ND filter 82 embedded therein is superposed on a region 80B including the optical axis L therein; the full open state in which the light is incident into the line CCD 64 for regular reading or brightness correction while the light shutting-off portion 80A is retracting to a position where it cannot interfere with the region 80B; and the light reducing state in which the light incident into the line CCD 64 is reduced by the ND filter 82 for linearity correction while the ND filter 82 is superposed on the region 80B.

In the image reading apparatus constituted as described above, fine scanning is performed in order to obtain reproducing image data of a high quality after pre-scanning in which the line CCD scanner 12 preliminarily reads the photographic film 48. The pre-scanning is performed by using a sub-scanning speed, i.e., a feeding speed of the photographic film 48 during the reading as a maximum speed under the fixed reading conditions set by the light source diaphragm 44, the lens diaphragm 76, the CCD electronic shutter and the like. The image reading apparatus judges the concentration, color balance and the like of all of the film images of the photographic film 48 based on the image data obtained by the pre-scanning, sets the reading conditions for the fine scanning with respect to each of the film images based on the judgment results, and controls the light source diaphragm 44, the turret 46, the lens diaphragm 76, the CCD electronic shutter and the like according to the resultant reading conditions. Here, the pre-scanning is performed while the photographic film 48 is fed at a high speed in one direction. In contrast, the fine scanning is performed while the photographic film 48 is fed at a low speed in a reverse feeding direction after the completion of the pre-scanning with respect to all of the photographic images of the photographic film 48. An electric signal output from the line CCD 64 during the fine scanning is converted into digital data, and then, is output to the image processing unit 14.

Figure 9:
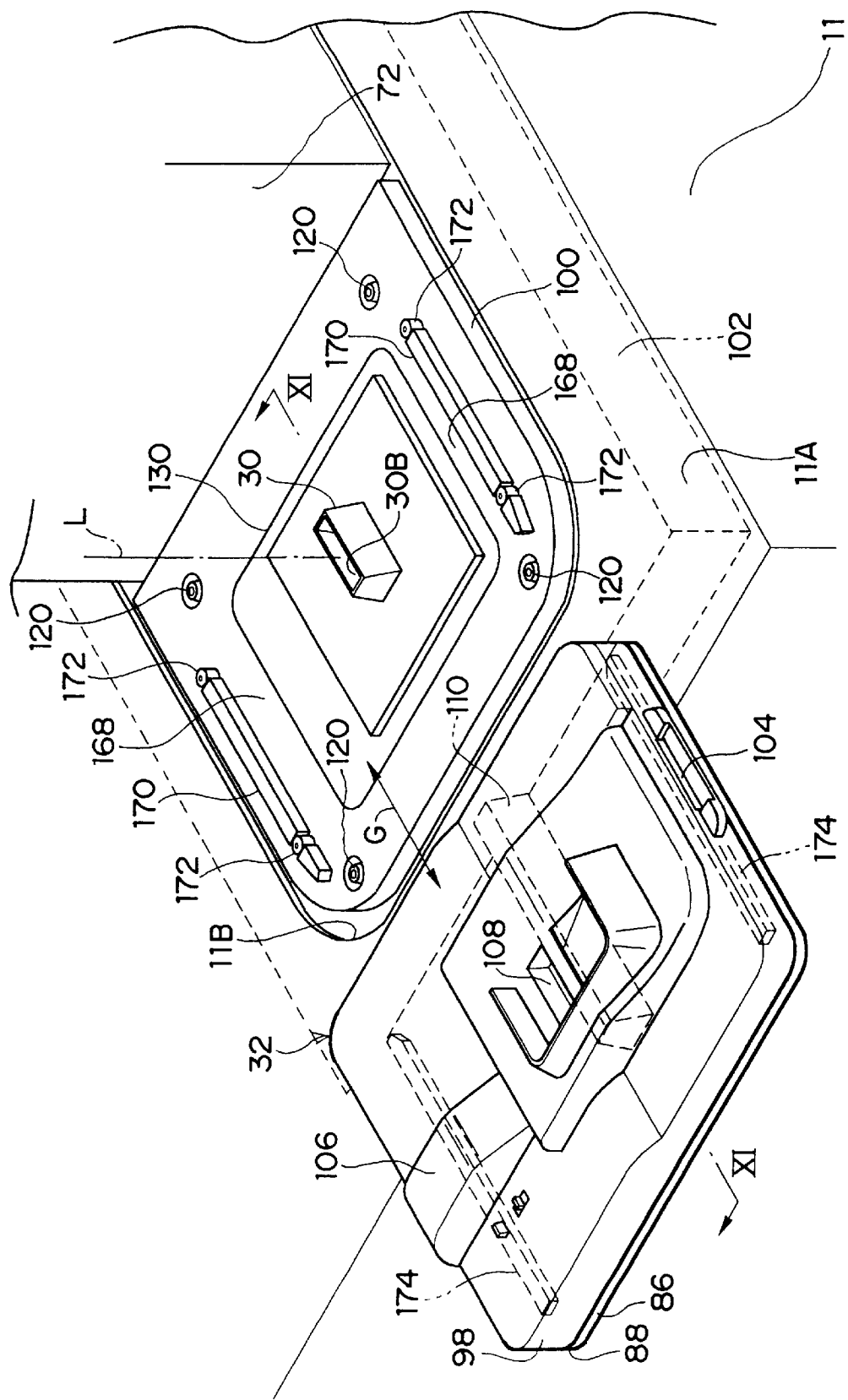
FIG. 9 is a perspective view showing a film carrier, a mirror box and a supporting/positioning plate, in which the film carrier and the mirror box can be detachably disposed, in the image reading apparatus shown in FIG. 1.

Next, a detailed description will be given of the configuration of the mirror box, the film carrier and a supporting/positioning plate in the image reading apparatus in the present embodiment in order to attain the first object according to the present invention. FIG. 9 shows the mirror box 30, the film carrier 32 and the supporting/positioning plate 100 for use in the photographic film 48 of a 135 size. As shown in FIG. 9, the film carrier 32 is provided with a substantially box-like casing 88 composed of an upper cover 98 and a base 86. Inside the casing 88 are contained various members (not shown) including the pair of feeding rollers in association with a film feeding operation. An insertion port 104 is formed at one end of the casing 88 for allowing the photographic film 48 to be inserted thereinto, while a containing portion 106 is disposed at the other end in such a manner as to define an inside space for containing the photographic film 48 therein. Inside the casing 88 is formed a film feeding path extending from the insertion port 104 to the containing portion 106. A tip detecting sensor for detecting the tip of the photographic film 48, the pairs of feeding rollers and the like are disposed along the film feeding path.

The reading position R is set at a predetermined position on the film feeding path in the film carrier 32 in the film feeding direction. An elongated slit 108 is formed in the upper cover 98 right above the reading position R in the film width direction of the photographic film 48. Also in the base 86, another elongated slit (not shown) is formed right under the reading position R in the film width direction of the photographic film 48, for allowing the light emitted from the mirror box 30 to be transmitted therethrough. The slit light is irradiated from below to the photographic film 48 carried by the film carrier 32 at the reading position R. The light transmitted through the photographic film 48 is incident into the lens unit 70 located above the film carrier 32. The film carrier 32 is provided with a film guide (not shown) for holding the photographic film 48 in the state curved into a U shape from the reading position R at which the top of the photographic film 48 is irradiated with the slit light emitted from the mirror box 30. Consequently, it is possible to enhance flatness of the photographic film 48 at the reading position R in comparison with the case where the photographic film 48 is not curved. A groove 110 to be inserted, which is recessed toward the reading position R, is formed at the lower surface of the film carrier 32 in order to shorten the length of the optical path from the light diffusing plate 30B of the mirror box 30 to the reading position R. The groove 110 to be inserted extends substantially in parallel to the film width direction from one side surface in the film width direction toward a position transverse to the photographic film 48. The upper end of the mirror box 30 is inserted into the groove 110 to be inserted in the state in which the film carrier 32 is disposed in the apparatus body.

Figure 10:
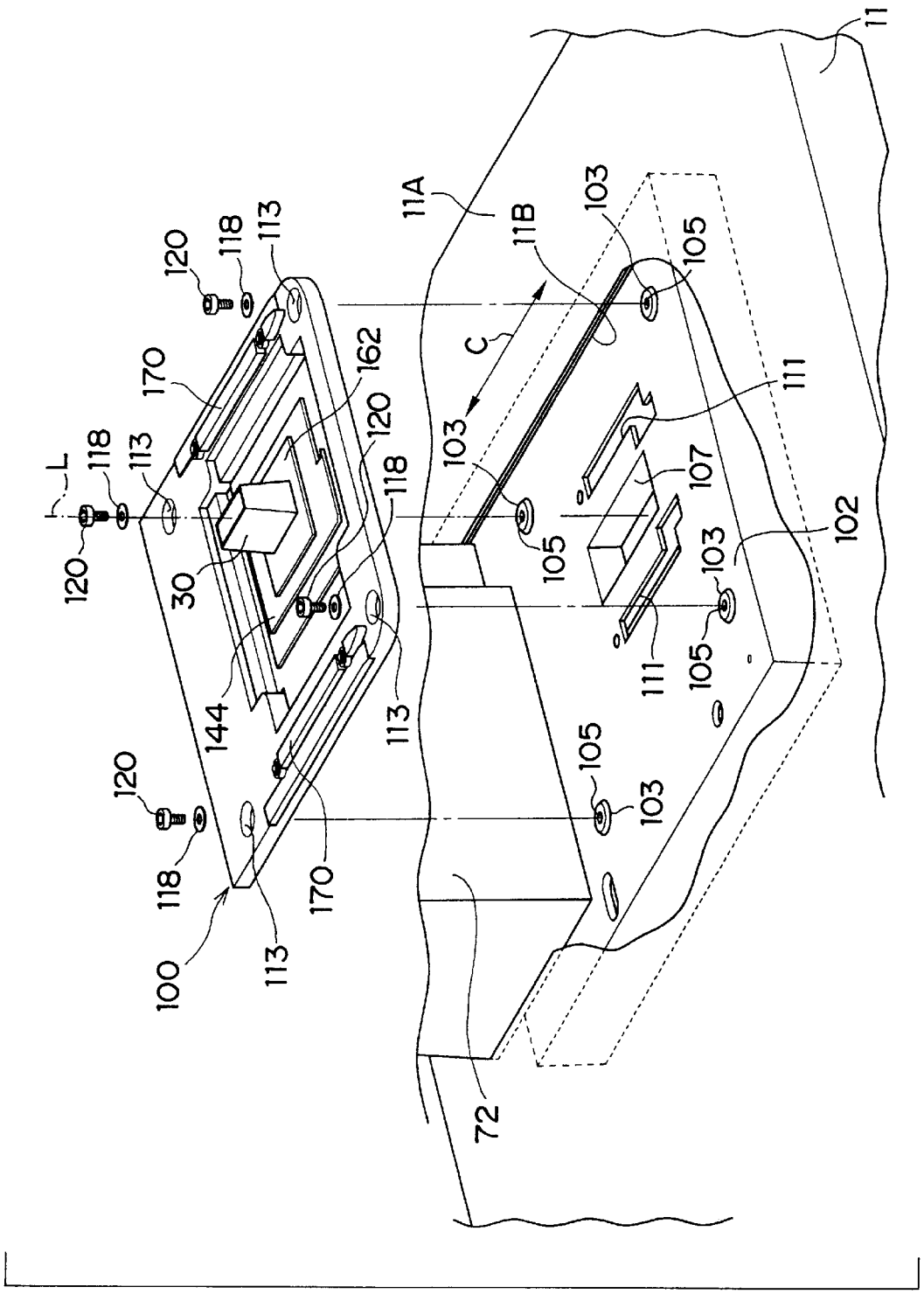
FIG. 10 is an exploded perspective view showing the supporting/positioning plate to be fixed to a base frame in the image reading apparatus shown in FIG. 1.

As shown in FIG. 10, a base frame 102 formed integrally with a support frame 72 is housed inside the working table 11. The support frame 72 and the base frame 102 have sufficient strength enough to prevent any generation of elastic and plastic deformations, and further, are fixed to each other with sufficient strength. A substantially square opening 11B is formed at the working surface 11A of the working table 11. The center portion of the upper surface of the base frame 102 is exposed to the outside through the opening 11B. A truncated conical slide supporter 103 is projected from each of four corners at the upper surface of the base frame 102. The slide supporters 103 are formed at the same height from the upper surface of the base frame 102, wherein the upper surfaces of the slide supporters 103 are parallel to the plane perpendicular to the optical axis L. A screw hole 105 is bored at the upper surface of each of the slide supporters 103.

At the center of the upper surface of the base frame 102 is formed a rectangular opening 107 penetrating down to the lower surface along the optical axis L of the lens unit 70. Furthermore, a pair of slits 111 are formed along a pair of long side edges of the opening 107. Here, the opening 107 is formed into a rectangle in which the film width direction (a direction indicated by an arrow C) of the photographic film 48 carried to the reading position R by the film carrier 32 is set in a longitudinal direction. The pair of slits 111 are parallel to each other while the film width direction is set in a longitudinal direction, and are cranked in such a manner that the respective ends on a side apart from the support frame 72 approach each other.

Figure 11:
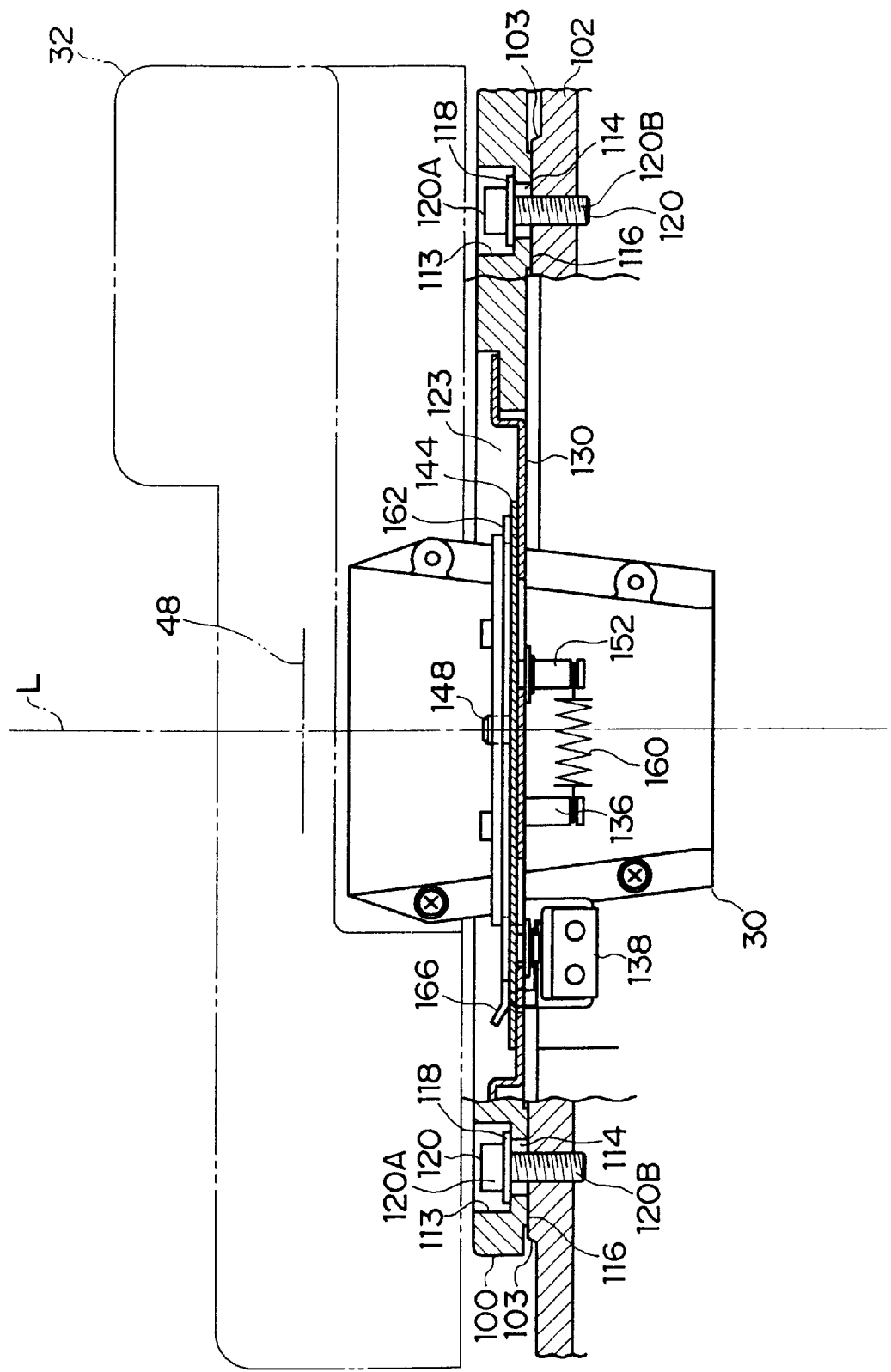
FIG. 11 is a sid e cross-sectional view showing the base frame and the supporting/positioning plate, taken along a line XI—XI of FIG. 9.

As shown in FIG. 10, the supporting/positioning plate 100 is mounted on the base frame 102. The supporting/positioning plate 100 is formed into a substantial square, in which a direction parallel to the optical axis L (hereinafter, referred to as an optical axis direction ) is set in a thickness direction. At the upper surface of the supporting/positioning plate 100, countersunk recesses 113 are formed at positions corresponding to the slide supporters 103. The bottom surface of the countersunk recess 113 is flat. A screw inserting hole 114 penetrating through the lower surface of the base frame 102 is formed at the bottom surface of the countersunk recess 113, as shown in FIG. 11. On the other hand, a columnar slide portion 116 is projected from the lower surface of the supporting/positioning plate 100 around the screw inserting hole 114, as shown in FIG. 11. These slide portions 116 are formed at the same height from the lower surface of the supporting/positioning plate 100. The lower surface of the slide portion 116 is parallel to the plane perpendicular to the optical axis L.

In mounting the supporting/positioning plate 100 on the base frame 102, the supporting/positioning plate 100 is mounted on the base frame 102 in such a manner that the lower surface of the slide portion 116 is brought into contact with the upper surface of the slide supporter 103. At this time, a plain washer 118 is inserted into each of the four countersunk recesses 113, as shown in FIG. 10. Furthermore, a hexagon socket head cap screw 120 is inserted into each of the four screw inserting holes 114 from the side of the countersunk recess 113, and the tip of each of the four screws 120 is inserted into a screw hole 105 formed at the base frame 102. In this state, the screw 120 is rotated in a tightening direction by a tool such as a hexagonal wrench, to be thus tightened by predetermined torque, so that the head 120A of the screw 120 brings the slide portion 116 of the supporting/positioning plate 100 into press-contact with the slide supporter 103 of the base frame 102 via the plain washer 118. Consequently, the supporting/positioning plate 100 can be fixed to the base frame 102, and further, can be supported by the base frame 102 in such a manner that the upper and lower surfaces of the supporting/positioning plate 100 are perpendicular to the optical axis L.

The inner diameter of the screw inserting hole 114 in the supporting/positioning plate 100 is set larger than a diameter of a thread portion 120B of the screw 120, as shown in FIG. 11. Therefore, if the four screws 120 are loosened, the supporting/positioning plate 100 can be slid in an arbitrary direction perpendicular to the optical axis L by a distance equal to a difference between the outer diameter of the screw 120 and the inner diameter of the screw inserting hole 114 while the lower surface of the slide portion 116 slides at the upper surface of the slide supporter 103. Accordingly, the supporting/positioning plate 100 is positioned with respect to the lens unit 70 in the optical axis direction with high accuracy by the base frame 102, and then, is supported in such a manner that its position can be freely adjusted only in the direction perpendicular to the optical axis L (the optical axis adjusting direction) by movable supporting means.

Subsequently, explanation will be made on the configuration of a mirror box attaching/detaching portion in the supporting/positioning plate 100, to which the mirror box 30 is detachably attached. As shown in FIG. 11, a substantially square opening 123 is formed at the center of the supporting/positioning plate 100, and a support plate 130 is fixed to the supporting/positioning plate 100 so as to close the opening 123. As shown in FIG. 12, a rectangular inserting hole 132 long in the film width direction (a direction indicated by an arrow C) is formed at substantially the center of the support plate 130. A pair of guide slits 134 are formed on both sides, respectively, with the inserting hole 132 held therebetween in a plate width direction (a direction indicated by an arrow E). The longitudinal direction of the guide slit 134 is parallel to the film width direction. The pair of guide slits 134 formed on either side of the inserting hole 132 are aligned along the same line.

At the lower surface of the support plate 130 are implanted lock pins 136 on both sides with the inserting hole 132 held therebetween in the plate width direction. The lock pin 136 is located at the intermediate position between the pair of guide slits 134 in the plate width direction. A lock groove 136A cut in the circumferential direction is formed at the tip of the lock pin 136. Additionally, a couple of micro switches 138 are disposed at the lower surface of the support plate 130 and at one end in the film width direction. Each of the micro switches 138 is adapted to oscillatably support a lever-like actuator 140, which is urged to an OFF position by a resilient member such as a plate spring housed inside the micro switch 138. A roller 142 is pivoted at the oscillating end of the actuator 140. Moreover, a through hole is formed at a position where the micro switch 138 is fixed to the support plate 130, and therefore, a part of the oscillating end of the actuator 140 kept at the OFF position in the micro switch 138 is projectingly exposed above the support plate 130 through the through hole.

As shown in FIG. 12, a slide plate 144 is mounted on the support plate 130. At substantially the center of the slide plate 144 is formed a mirror box inserting port 146 which is short in the film width direction and has a shape in conformity with the rectangular cross-section with respect to the optical axis L of the mirror box 30. At the upper surface of the slide plate 144 are implanted positioning pins 148 on both sides of the mirror box inserting port 146 held therebetween in the plate width direction. In contrast, at the lower surface of the slide plate 144 are implanted two pairs of guide pins 150 and 152 on both sides of the mirror box inserting port 146 held therebetween in the plate width direction. Out of these guide pins 150 and 152, the two guide pins 150 implanted in parallel on the side near the micro switch 138 in the film width direction are short while the two guide pins 152 implanted in parallel on the side remote from the micro switch 138 are long. A lock groove 150A cut in the circumferential direction is formed at the tip of the short guide pin 150; in contrast, lock grooves 152A and 152B cut in the circumferential direction are formed at the tip and root of the long guide pin 152, respectively. These four guide pins 150 and 152 are inserted into the four guide slits 134 formed at the support plate 130 in the state in which the slide plate 144 is mounted on the support plate 130. Consequently, the slide plates 144 mounted on the support plate 130 is supported slidably in the film width direction over the range corresponding to the guide slits 134.

As shown in FIG. 12, a pair of cutouts 154 are cut from one end of the slide plate 144 on the side of the micro switch 138 to the other end thereof in the film width direction. The tip of the actuator 140 in the micro switch 138 attached at the lower surface of the support plate 130 is projectingly exposed above the slide plate 144 through the cutout 154. Here, the cutout 154 is cut to a position where the cutout 154 is never brought into contact with the actuator 140 even if the slide plate 144 slides over the range corresponding to the guide slits 134 in the film width direction.

As shown in FIG. 12, the lock grooves 150A of the short guide pins 150 inserted into the guide slits 134 are projected downward of the support plate 130; meanwhile, the lock grooves 152A and 152B of the long guide pins 152 inserted into the guide slits 134 are projected from the lower surface of the support plate 130. At this moment, respective washers 156 are fitted to the guide pins 150 and 152, and further, C-rings 158 for preventing any falling-off are fitted to the lock grooves 150A and 152A in such a manner as to hold the washers 156 between the lower surface of the support plate 130 and the C-rings 158. In this manner, it is possible to prevent the guide pins 150 and 152 from falling from the guide slits 134.

Figure 13:
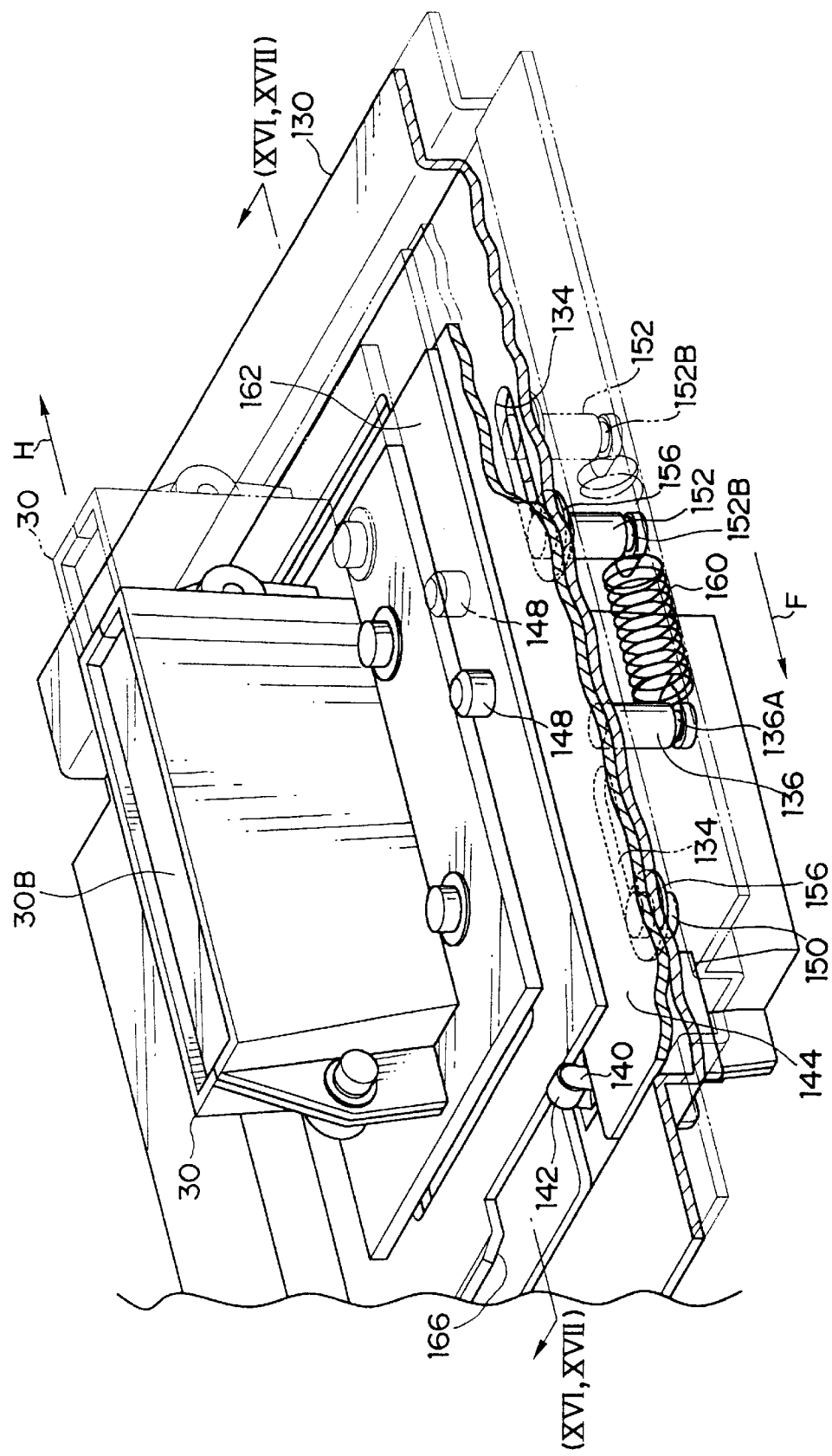
FIG. 13 is a perspective view showing the state in which the mirror box and its fixing mechanism shown in FIG. 12 are assembled.

The guide pin 152 of the slide plate 144 and the lock pin 136 of the support plate 130 are connected via a coil spring 160 having ring-like hooks formed at both ends thereof, as shown in FIG. 13. In the coil spring 160, one of the hooks is fitted to the lock groove 152B of the guide pin 152; and the other hook is fitted to the lock groove 136A of the lock pin 136. At this time, the coil spring 160 is deformed in an extension direction, thereby urging the slide plate 144 in a direction toward the micro switch 138 (in a direction indicated by an arrow F of FIG. 13). As a consequence, the guide pins 150 and 152 are brought into press-contact with respective one ends of the guide slits 134, so that the slide plate 144 can be positioned at a reference position in the film width direction.

The mirror box 30 is detachably attached to the supporting/positioning plate 100 via the slide plate 144. A flange-like attaching/detaching plate 162 is secured to the outer peripheral surface of the mirror box 30 in the vicinity of the center in the optical axis direction, as shown in FIG. 12. The attaching/detaching plate 162 is formed in such a manner as to have a substantially rectangular profile longer in a carrier attaching/detaching direction, and is secured to the mirror box 30 in such a manner that the upper and lower surfaces thereof are parallel to the plane perpendicular to the optical axis L. The attaching/detaching plate 162 is formed longer than the mirror box inserting port 146 of the slide plate 144 in both the film width direction and the plate width direction. A pair of positioning holes 164 are formed at both ends of the attaching/detaching plate 162 in the plate width direction with the mirror box 30 held therebetween, as shown in FIG. 12, and they are arranged at positions corresponding to the positioning pins 148 of the slide plate 144, respectively. Moreover, a striker 166 for the micro switch 138 is provided at one end of the attaching/detaching plate 162 in the film width direction. The striker 166 is projected to ward the micros witch 138 more than the other portions on the boundary near the center in the plate width direction, and is curved upward from the root to the tip thereof.

In disposing the mirror box 30 in the slide plate 144, the mirror box 30 is placed on the slide plate 144 in such a manner that the positions of the positioning holes 164 of the attaching/detaching plate 162 accord with the positions of the positioning pins 148 of the slide plate 144, and then, the lower end of the mirror box 30 is inserted into the mirror box inserting port 146 of the slide plate 144. Furthermore, the positioning holes 164 of the attaching/detaching plate 162 are fitted to the positioning pins 148 of the slide plate 144, and then, the lower end of the attaching/detaching plate 162 is brought into close contact with the upper surface of the slide plate 144. In this way, the mirror box 30 is positioned at a disposing position in the optical axis direction and the direction perpendicular to the optical axis L by the supporting/positioning plate 100.

At this time, if the slide plate 144 is located at the reference position, the mirror box 30 presses the actuator 140 by the striker 166 of the attaching/detaching plate 162, to turn on the micro switch 138, as shown in FIG. 13. In contrast, if the slide plate 144 is slid in a direction separated from the micro switch 138 (a direction indicated by an arrow H of FIG. 13) against the urging force of the coil spring 160, as shown in FIG. 13, the striker 166 of the attaching/detaching plate 162 is separated from the actuator 140, whereby the micro switch 138 is turned off.

As described above, in the state in which the support plate 130 and the slide plate 144 are fixed to the supporting/positioning plate 100 and the mirror box 30 is mounted on the slide plate 144, the lower end of the mirror box 30 is inserted into the opening 107 of the base frame 102; and the lock pins 136 of the support plate 130, the guide pins 150 and 152 of the slide plate 144 and the micro switches 138 are inserted into the pair of slits 111 of the base frame 102. Since the opening 107 and the slits 111 are formed sufficiently longer in the film width direction than the guide slits 134 of the support plate 130, it is possible to prevent any contact between the base frame 102 and the mirror box 30 and between the base frame 102 and the guide pins 150 and 152 even if the slide plate 144 is moved over the range corresponding to the guide slits 134. Additionally, the mirror box 30 mounted on the slide plate 144 is supported in such a manner that the upper end of the mirror box 30 is projected toward the reader unit 34 with respect to the upper surface of the supporting/positioning plate 100.

Next, a description will be given of the configuration of a film carrier attaching/detaching unit in the supporting/positioning plate 100, to which the film carrier 32 is detachably attached. As shown in FIG. 9, a pair of guide rails 170 extending in a carrier attaching/detaching direction (a direction indicated by an arrow G) are disposed at the upper surface of the supporting/positioning plate 100. The guide rail 170 is provided with a pair of rollers (rotary support members) 172 turnably fixed in order to suppress slide resistance of the film carrier 32 along the guide rail 170. In contrast, a pair of guide projections 174 extending in the carrier attaching/detaching direction are formed at positions corresponding to the pair of guide rails 170 at the lower surface of the film carrier 32, respectively.

In the case where the film carrier 32 is disposed in the supporting/positioning plate 100, the end on the disposing side of the film carrier 32 is placed at the end short of the supporting/positioning plate 100; the pair of guide projections 174 of the film carrier 32 are positioned in accordance with the pair of guide rails 170; and then, the film carrier 32 is slid toward the support frame 72 on a support guide surface 168. Consequently, the film carrier 32 is moved in the disposing direction while contacting with the upper and inner surfaces of the guide rails 170. At this moment, the upper end of the mirror box 30 is inserted into the groove 110 to be inserted without any contact with the film carrier 32. The film carrier 32 is provided with a stopper (not shown) for restricting the movement of the film carrier 32 in abutment against respective one ends of the guide rails 170 when the film carrier 32 is slid to the predetermined disposing position. This stopper can position the film carrier 32 at the disposing position on the supporting/positioning plate 100, as shown in FIG. 10. In the film carrier 32 positioned at the disposing position, an opening (not shown) on the incident side at the lower surface of the casing 88 serving as a light incident port faces to the light diffusing plate 30B of the mirror box 30, and further, the center of the opening on the incident side accords with the optical axis L of the reading light to be emitted from the light diffusing plate 30B. In this manner, the reading light emitted from the light diffusing plate 30B is irradiated to the reading position R, and the center beam of the light emitted from the light diffusing plate 30B of the mirror box 30 transmits the center position in the film width direction of the photographic film 48 carried to the reading position R by the film carrier 32.

In detaching the film carrier 32 from the supporting/positioning plate 100, the film carrier 32 is slid along the support guide surface 168 and the guide rails 170 in a direction separated from the support frame 72, so that the film carrier 32 is detached from the supporting/positioning plate 100. On the other hand, in detaching the mirror box 30 from the supporting/positioning plate 100, the mirror box 30 is lifted upward along the optical axis L together with the attaching/detaching plate 162 in the state in which the film carrier 32 is detached from the supporting/positioning plate 100, so that the positioning holes 164 of the attaching/detaching plate 162 are released from the positioning pins 148, and thus, the lower end of the mirror box 30 can be drawn from the opening 107 of the base frame 102.

In the image reading apparatus 10 in the present preferred embodiment in order to attain the first object according to the present invention as described above, the length of the optical path from the light diffusing plate 30B to the reading position R is reduced by inserting the upper end of the mirror box 30 into the groove 110 to be inserted of the film carrier 32, thereby suppressing a loss of the reading light emitted from the light diffusing plate 30B. In order to further effectively suppress a loss of the reading light, it is necessary to reduce a distance (the length of the optical path) from the light diffusing plate 30B to the opening formed at the lower surface of the film carrier 32 as possible. For this purpose, since the shape of the mirror box 30 is different depending upon the type of photographic film in the image reading apparatus in the present embodiment, the shape of the groove 110 to be inserted of the film carrier 32 is varied depending upon the shape of the mirror box 30 accordingly, so that the distance from the light diffusing plate 30B to the opening on the incident side of the film carrier 32 is shortened as possible. As a result, in the case where the type of photographic film 48 handled by the mirror box 30 previously disposed in the supporting/positioning plate 100 is different from the type of photographic film 48 handled by the film carrier 32 disposed in the supporting/positioning plate 100, i.e., in the case where the combination of the mirror box 30 and the film carrier 32 disposed in the supporting/positioning plate 100 is incorrect, a part of the film carrier 32 disposed in the supporting/positioning plate 100 may accidentally abut against the upper end of the mirror box 30. In this case, the mirror box 30 is slid toward the support frame 72 together with the slide plate 144 against the urging force of the coil spring 160, as shown in FIG. 13. As a consequence, the striker 166 of the slide plate 144 is separated from the micro switch 138, so that the micro switch 138 is turned off. In the image reading apparatus in the present embodiment, a contact signal output from the micro switch 138 being in the ON state is input into a control unit (not shown). The control unit judges that the mirror box 30 disposed in the apparatus body is located at the disposing position when it receives the contact signal from either one of the two micro switches 138; in contrast, it judges that the mirror box 30 disposed in the apparatus body is moved from the disposing position when it receives no contact signal from either of the two micro switches 138. If the control unit judges that the mirror box 30 is moved from the reference fixing position, it displays an alarm message on the display 19 and generates alarm sound by a buzzer (not shown), for example.

Figure 6:
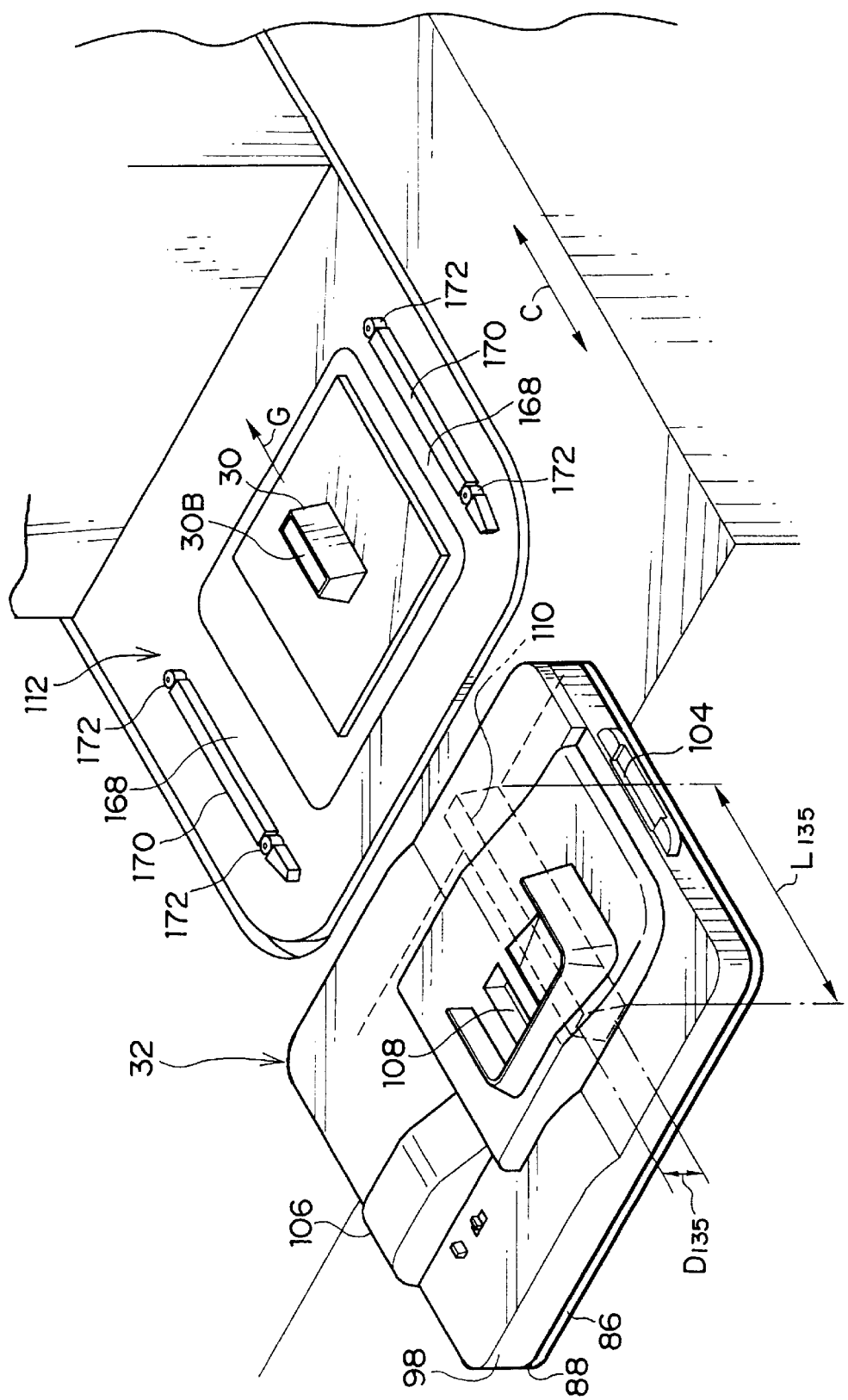
FIG. 6 is a perspective view showing a film carrier, a mirror box and a film carrier supporting portion suitable for a photographic film of a 135 size in the image reading apparatus shown in FIG. 1.
Figure 7:
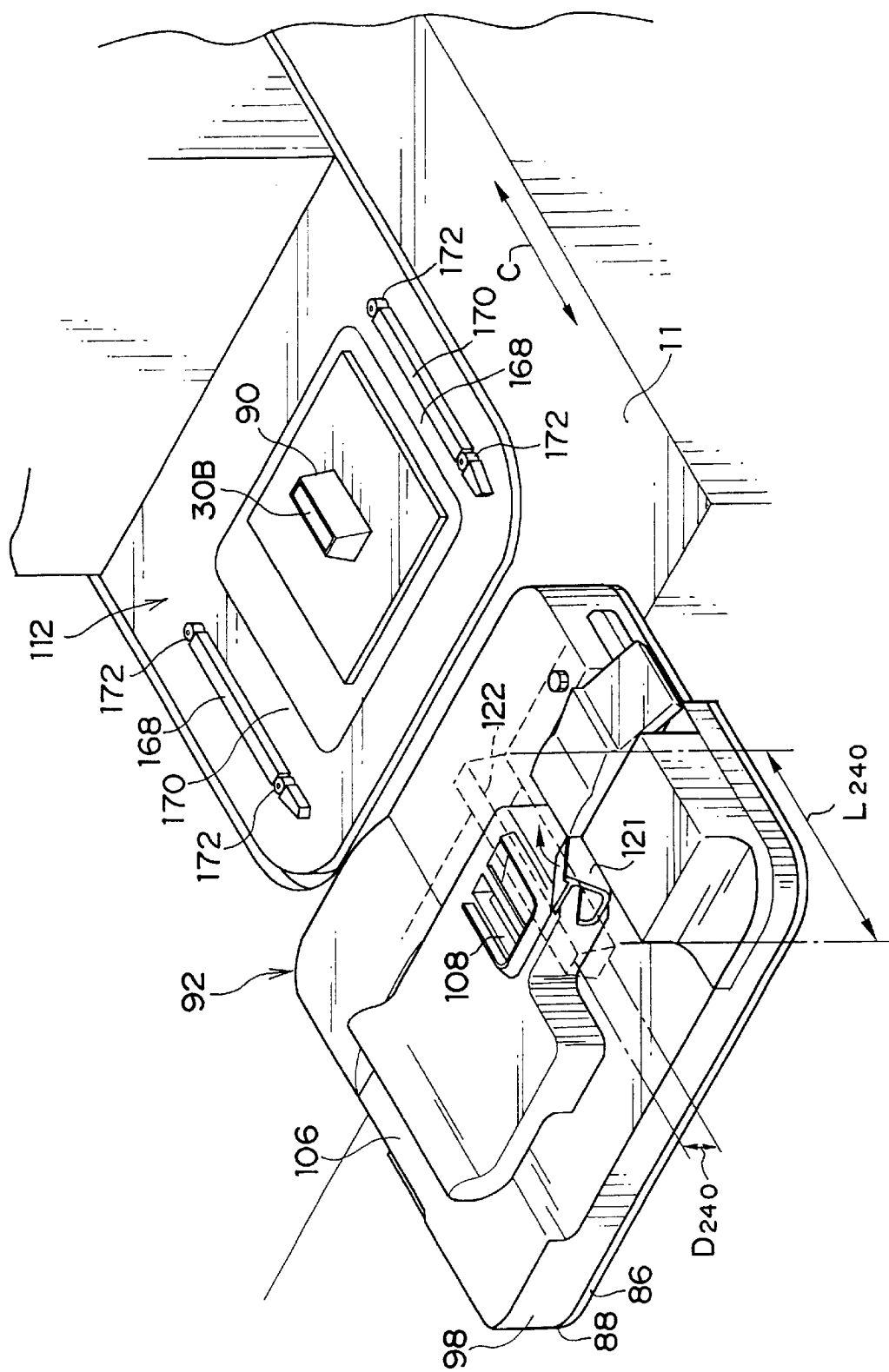
FIG. 7 is a perspective view showing a film carrier, a mirror box and a film carrier supporting portion suitable for a photographic film of a 240 size in the image reading apparatus shown in FIG. 1.
Figure 8:
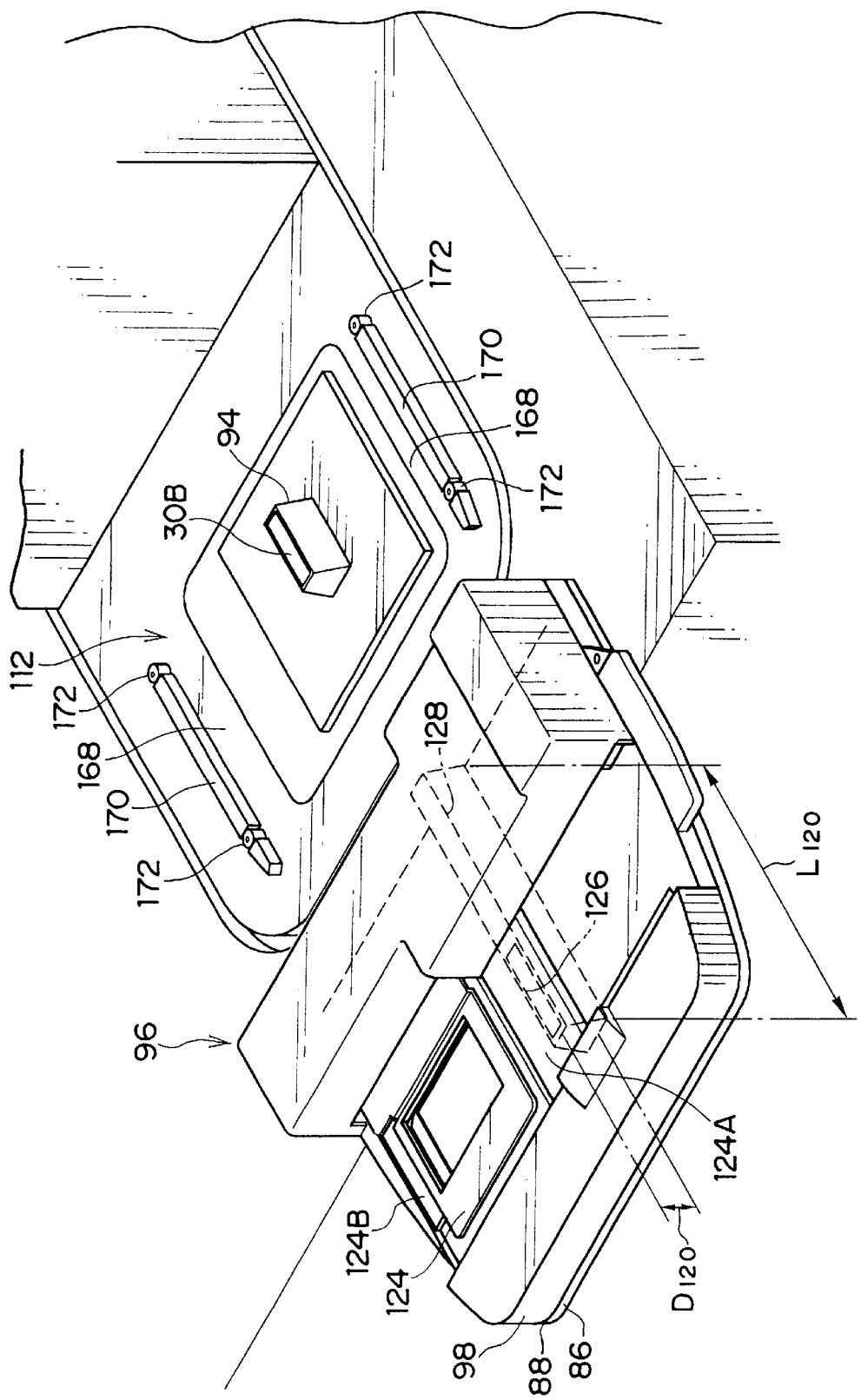
FIG. 8 is a perspective view showing a film carrier, a mirror box and a film carrier supporting portion suitable for a photographic film of a 120 size in the image reading apparatus shown in FIG. 1.

Subsequently, a detailed description will be given of the configurations of the mirror box and the film carrier in the preferred embodiment in order to attain the second object according to the present invention. As described already, the mirror box 30 and the film carrier 32 shown in FIGS. 2 and 3 are used for the photographic film 48 of a 135 size, and therefore, other mirror boxes and film carriers of different shapes and structures are used exclusively for other types of photographic films. FIG. 6 shows the mirror box 30 and the film carrier 32 exclusively used for the photographic film 48 of a 135 size; FIG. 7 shows a mirror box 90 and a film carrier 92 exclusively used for a photographic film (an APS film) of a 240 size; and FIG. 8 shows a mirror box 94 and a film carrier 96 exclusively used for a photographic film of a 220 size.

As shown in FIG. 6, the film carrier 32 exclusively used for the photographic film 48 of a 135 size is provided with the substantially box-like casing 88 composed of the upper cover 98 and the base 86. Inside the casing 88 are contained the various members (not shown) including the pair of feeding rollers in association with the film feeding operation. The insertion port 104 is formed at one end of the casing 88 for allowing the photographic film 48 to be inserted thereinto, while the containing portion 106 is disposed at the other end in such a manner as to define the inside space for containing the photographic film 48 therein. Inside the casing 88 is formed the film feeding path extending from the insertion port 104 to the containing portion 106. The tip detecting sensor for detecting the tip of the photographic film 48, the pairs of feeding rollers and the like are disposed along the film feeding path.

The reading position R is set at a predetermined position on the film feeding path in the film carrier 32 in the film feeding direction. The elongated slit 108 is formed in the upper cover 98 right above the reading position R in the film width direction of the photographic film 48. Also in the base 86, another elongated slit (not shown) is formed right under the reading position R in the film width direction of the photographic film 48, for allowing the light emitted from the mirror box 30 to be transmitted therethrough. The slit light is irradiated from below to the photographic film 48 carried by the film carrier 32 at the reading position R. The light transmitted through the photographic film 48 is incident into the reader unit 34 located above the film carrier 32.

A film carrier supporting portion 112, to which the film carrier 32 is detachably disposed, is mounted on the working table 11. The film carrier supporting portion 112 is provided with the support guide surface 168 in contact with the film carrier 32, and the pair of guide rails 170 extending in the carrier attaching/detaching direction (a direction indicated by an arrow C) along the circumferential edge of the support guide surface 168. The guide rail 170 is provided with the couple of rollers 172 turnably fixed in order to suppress slide resistance of the film carrier 32 along the guide rail 170. In contrast, a pair of guide grooves (not shown) extending in the carrier attaching/detaching direction of the film carrier supporting portion 112 are formed at positions corresponding to the pair of guide rails 170 at the lower surface of the film carrier 32. Furthermore, the mirror box 30 is supported by the working table 11 in such a manner that the upper end thereof projects toward the reading position R side with respect to the support guide surface 168.

In the case where the film carrier 32 is disposed in the film carrier supporting portion 112, the side end of the film carrier 32 with an opening end of the groove 110 formed thereat is placed on the support guide surface 168; the pair of guide grooves of the film carrier 32 are positioned in accordance with the pair of guide rails 170; and then, the film carrier 32 is slid in the disposing direction toward the optical axis L. Consequently, the film carrier 32 can be slid under the guidance of the support guide surface 168 and the pair of guide rails 170. At this moment, the upper end of the mirror box 30 is inserted into the groove 110 to be inserted without any contact with the film carrier 32. The film carrier 32 is provided with the stopper (not shown) for restricting the movement of the film carrier 32 in abutment against the respective one ends of the guide rails 170 when the film carrier 32 is slid to the predetermined disposing position. This stopper can position the film carrier 32 at the disposing position on the film carrier supporting portion 112, as shown in FIG. 16.

In the film carrier 32 positioned at the disposing position, the opening of the base 86 serving as the light incident port into the carrier faces to the light diffusing plate 30B of the mirror box 30, and further, the center of the opening accords with the optical axis L of the reading light to be emitted from the light diffusing plate 30B. In this manner, the reading light emitted from the light diffusing plate 30B is irradiated to the reading position R.

Next, explanation will be made on the configurations of the mirror box 90 and the film carrier 92 exclusively used for the photographic film of a 240 size and the mirror box 94 and the film carrier 96 exclusively used for the photographic film of a 120 size in reference to FIGS. 7 and 8. The members of FIGS. 7 and 8 basically having the same configurations and functions as those of the members referred to in the explanation of the mirror box 30 and the film carrier 32 exclusively used for the photographic film of a 135 size are designated by the same reference numerals, and therefore, the explanation will be omitted.

Since the photographic film of a 240 size is handled in a state contained in a film case (cartridge) also after development, a film holder 121, into which the photographic film contained inside the film case can be inserted, is disposed in the film carrier 92 exclusively used for the photographic film of a 240 size, as shown in FIG. 7. The film holder 121 is oscillatably supported over an attaching/detaching position where the photographic film shown in FIG. 7 can be attached or detached and a feeding position where the photographic film can be fed into a film feeding path inside the film carrier 92. A groove 122 to be inserted is formed at the lower surface of the film carrier 92, like the case of the film carrier 32. However, since the film width of the photographic film of a 240 size is smaller than that of the photographic film of a 135 size, the groove 122 to be inserted is set shorter than the groove 110 to be inserted in the carrier attaching/detaching direction. For the same reason, the length of the upper end of the mirror box 90 in the carrier attaching/detaching direction is set shorter than that of the mirror box 30.

Since the photographic film of a 120 size is handled in a state fixed to a special holder in separation in each region of a projected image after development, a film holder 124, into which the photographic film fixed to the holder can be inserted, is disposed in the film carrier 96 exclusively used for the photographic film of a 120 size, as shown in FIG. 8. The film holder 124 is supported movably in a film feeding direction perpendicular to the film width direction (sub-scanning direction). During an image reading operation, the film holder 124 is moved from a starting position shown in FIG. 8 to an ending position on an opposite side with an opening 126 at the lower surface of the film carrier 96 held therebetween. Moreover, shutting-off portions 124A and 124B for closing the opening 126 at the starting position and the ending position are provided at both ends of the film holder 124 in the film feeding direction, respectively. Although a groove 128 to be inserted is formed at the lower surface of the film carrier 96, like the case of the film carrier 32, the groove 128 to be inserted is set longer than the groove 110 to be inserted in the carrier attaching/detaching direction since the film width of the photographic film of a 135 size is smaller than that of the photographic film of a 120 size. For the same reason, the upper end of the mirror box 94 is set longer than that of the mirror box 30 in the carrier attaching/detaching direction.

In comparison of the shapes of the film carriers 32, 92 and 94 described above, the interrelationship among the lengths $L_{135}$, $L_{240}$ and $L_{120}$ of the grooves 110, 122 and 128 to be inserted is expressed by the following inequality (1):

$$L_{120} > L_{135} > L_{240} \tag{1}$$

In the image reading apparatus in the present embodiment, the upper end of the mirror box 30, 90 or 94 is inserted into the groove 110, 122 or 128 of the film carrier 32, 92 or 96, thereby reducing the length of the optical path from the light diffusing plate 30B to the reading position R so as to suppress a loss of the reading light emitted from the light diffusing plate 30B. In order to further effectively suppress a loss of the reading light, it is necessary to reduce the distance (the length of the optical path) from the light diffusing plate 30B to the opening at the lower surface of the film carrier 32, 92 or 96 as possible. For this purpose, since the shape of the mirror box 30, 90 or 94 is different depending upon the type of photographic film in the image reading apparatus in the present embodiment, the shape of the groove to be inserted of the film carrier 32, 92 or 96 is varied depending upon the shape of the mirror box 30 accordingly, 90 or 94, so that the distance from the light diffusing plate 30B to the opening at the lower surface of the film carrier 32, 92 or 96 is reduced as possible. In consideration of this, the film carriers 32, 92 and 96 are formed in such a manner as to have the interrelationship expressed by the following inequality (2):

$$D_{120} < D_{135} < D_{240} \tag{2}$$

where $D_{135}$, $D_{240}$ and $D_{120}$ represent the depths of the grooves 110, 122 and 128 of the film carriers 32, 92 and 96, respectively (see FIGS. 6, 7 and 8).

Subsequently, explanation will be made on the fixing mechanism of the mirror box 30 to be fixed to the apparatus body in the state supported by the working table 11. The explanation below will be made on the case where a mirror box to be fixed to the apparatus body is the mirror box 30 exclusively used for the photographic film 48 of a 135 size. An opening (not shown) is formed inward of the film carrier supporting portion 120 on the working table 11. The support plate 130 is fixed to close the opening. The insertion port 132 longer in the carrier attaching/detaching direction is formed at substantially the center of the support plate 130, as shown in FIG. 12. At the upper surface of the support plate 130, the pair of guide slits 134 are formed on both sides, respectively, with the inserting hole 132 held therebetween in the plate width direction (the direction indicated by the arrow F) perpendicular to the carrier attaching/detaching direction. The longitudinal direction of the guide slit 134 is set in the carrier attaching/detaching direction. The pair of guide slits 134 formed on either side of the inserting hole 132 are aligned along the same line.

Additionally, the striker 166 of the attaching/detaching plate 162 presses the roller 142 of the actuator 140 of one of the micro switches 138, to turn on the micro switch 138, as shown in FIG. 16. Otherwise, if the slide plate 144 is oscillated from the reference fixing position toward the disposing direction of the film carrier 32 (a direction indicated by an arrow I of FIG. 16) against the urging force of the coil spring 160, as shown in FIG. 17, the striker 166 of the attaching/detaching plate 162 is separated from the actuator 140 to turn off the micro switch 138.

In comparison of the fixing structures of the mirror box 90 exclusively used for the photographic film of a 240 size and the mirror box 94 exclusively used for the photographic film of a 120 size to the apparatus body with the fixing structure of the mirror box 30 exclusively used for the photographic film of a 135 size, merely the shapes of the fixing plates are partly different according to the shapes of the mirror boxes 90 and 94, but the other configuration is basically identical to each other, so its explanation will be omitted. As for the micro switch 138 actuated by the striker, not two but one may be selected according to the type of photographic film by varying the position of the striker formed at the fixing plate.

In the image reading apparatus in the present embodiment in order to attain the second object according to the present invention, a contact signal output from the micro switch 138 being in the ON state is input into a control unit (not shown). The control unit judges that the mirror box 30, 90 or 94 disposed in the apparatus body is located at the reference disposing position when it receives the contact signal from either one of the two micro switches 138; in contrast, it judges that the mirror box 30, 90 or 94 disposed in the apparatus body is moved from the reference disposing position when it receives no contact signal from either of the two micro switches 138. If the control unit judges that the mirror box 30, 90 or 94 is moved from the reference fixing position, it displays an alarm message on the display 19 and generates alarm sound by a buzzer (not shown), for example.

Figure 14:
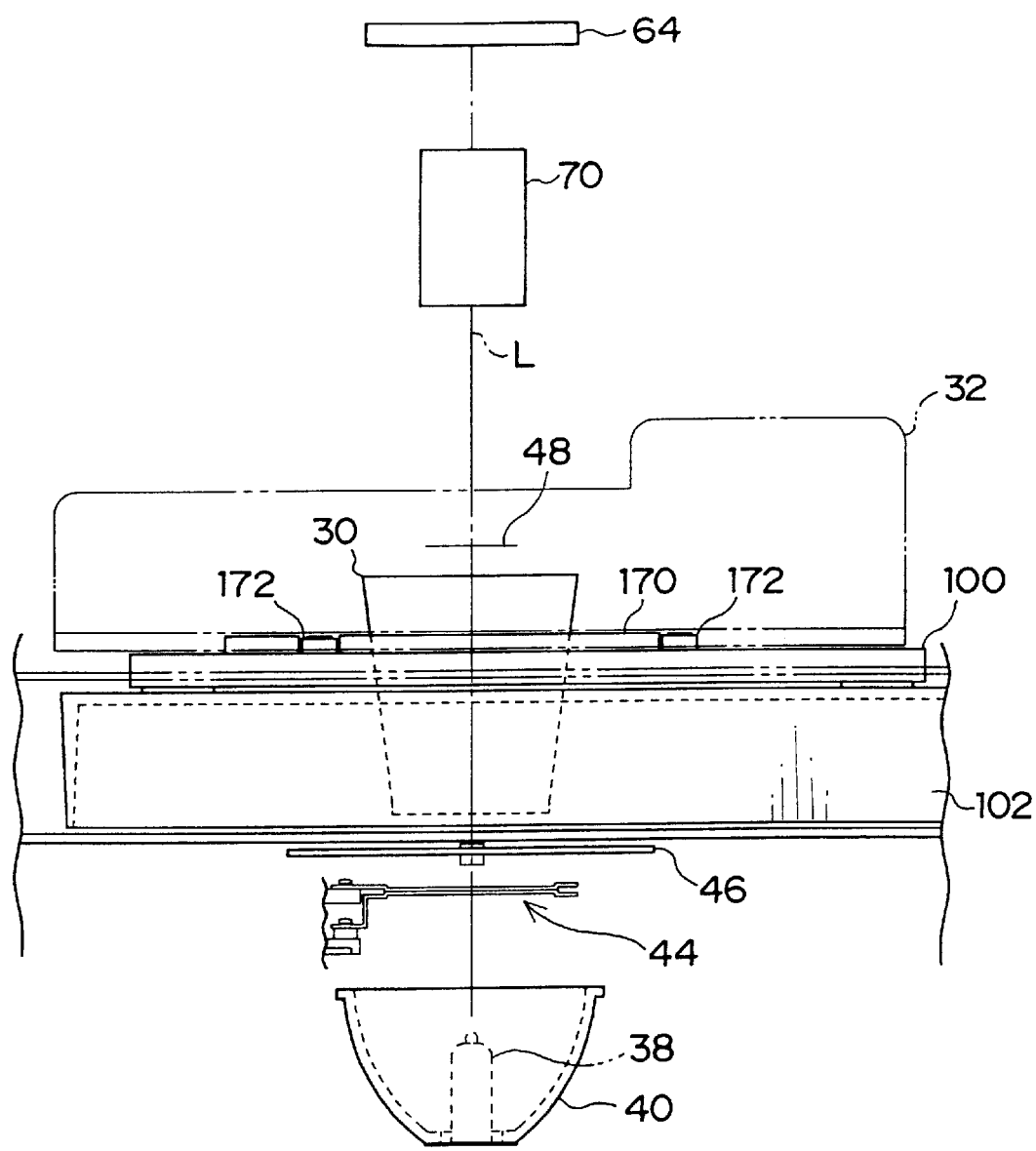
FIG. 14 is a side view particularly showing members disposed along an optical axis L of a lens unit in the image reading apparatus in the present embodiment.

Subsequently, explanation will be made on the optical axis adjusting method and operation with respect to the mirror box 30 and the film carrier 32 in the image reading apparatus 10 in the present embodiment in order to attain the first object according to the present invention. In the case of optical axis adjustment with respect to the mirror box 30 and the film carrier 32 in the present embodiment, the mirror box 30 and the film carrier 32 are mounted on the supporting/positioning plate 100, respectively, as shown in FIGS. 14 and 15. The lamp 38 is lighted in the state in which all of the four socket head cap screws 120 for securely tightening the supporting/positioning plate 100 onto the base frame 102 are loosened. Consequently, the light emitted from the lamp 38 is incident into the mirror box 30, to be guided inside the mirror box 30, and then, is emitted from the light diffusing plate 30B. This light is irradiated to the photographic film 48 loaded in the film carrier 32, to be transmitted through the photographic film 48 and then, is incident into an entrance pupil of the lens unit 70. In this state, the supporting/positioning plate 100 is slid toward the optical axis adjusting direction while monitoring an image signal output from the line CCD 64, and then, the supporting/positioning plate 100 is positioned in such a manner that an image point by the lens unit 70 is accurately located at the sensing portion of the line CCD 64. Upon completion of the positioning operation of the supporting/positioning plate 100, the four socket head cap screws 120 are tightened by predetermined torque, thereby leading to the completion of the optical axis adjustment with respect to the mirror box 30 and the film carrier 32. Incidentally, it is unnecessary to load the photographic film 48 in the film carrier 32 during this optical axis adjustment. A film-like adjusting jig having a predetermined test pattern formed thereon may be loaded in the film carrier 32 for the optical axis adjustment.

As described above, since the mirror box 30 and the film carrier 32 are disposed in the supporting/positioning plate 100, respectively, and further, are supported at the predetermined disposing positions by the supporting/positioning plate 100 in the image reading apparatus 10 in the present embodiment, it is possible to respectively position the mirror box 30 and the film carrier 32 with required accuracy and suppress relative displacement of either one of the mirror box 30 and the film carrier 32 disposed in the supporting/positioning plate 100 from the other. Therefore, after the mirror box 30 and the film carrier 32 together with the supporting/positioning plate 100 are adjusted to the respective predetermined positions with respect to the optical axis L of the lens unit 70 constituting the image forming optical system, it is possible to suppress the displacement of only one of the mirror box 30 and the film carrier 32 from the optical axis L, and further, it is possible to suppress the displacement of the film carrier 32 or the mirror box 30 to an amount slight enough to prevent any adverse influence on a quality of a reproduced image even if only either one of the mirror box 30 and the film carrier 32 is displaced from the optical axis L of the lens unit 70. As a result, it is possible to omit a position adjusting operation of either one of the mirror box 30 and the film carrier 32 with respect to the other in such a manner that the center beam of the light (a beam flux) emitted from the mirror box 30 accurately transmits through the image recording region of the photographic film 48 supported by the film carrier 32.

As shown in FIGS. 14 and 15, in the image reading apparatus 10 in the present embodiment, the supporting/positioning plate 100 is mounted on the base frame 102 and is supported in a position adjusting manner only in the direction perpendicular to the optical axis L (the optical axis adjusting direction) Consequently, with positional adjustment of the relative positional relationship between the mirror box 30 and the film carrier 32 on the supporting/positioning plate 100, the mirror box 30 and the film carrier 32 can be adjusted at the predetermined positions at the same time with respect to the optical axis L of the lens unit 70 only by adjusting the position of the supporting/positioning plate 100 in the optical axis adjusting direction without independently adjusting the positions of the mirror box 30 and the film carrier 32. As a consequence, it is possible to simplify the optical axis adjusting operation with respect to the mirror box 30 and the film carrier 32.

Furthermore, in the image reading apparatus 10 in the present embodiment, the mirror box 30 and the film carrier 32 are detachably mounted on the supporting/positioning plate 100, thereby simplifying the replacing operation of the mirror box 30 and the film carrier 32. Here, if the supporting/positioning plate 100, the mirror box 30 and the film carrier 32 have sufficiently high dimensional accuracy with respect to a positioning error which is allowable during the optical axis adjustment, it is possible to suppress a change of the relative position of one of the mirror box 30 and the film carrier 32 with respect to the other to a slight level even after the mirror box 30 and the film carrier 32 are replaced from the supporting/positioning plate 100. Consequently, it is possible to dispense with respective position adjusting operations of the mirror box 30 and the film carrier 32 after the replacement of the mirror box 30 and the film carrier 32.

Although explanation on the optical axis adjustment with respect to the light source composed of the lamp 38 and the reflector 40 has been omitted from the above description of the image reading apparatus 10 in the present embodiment for the first object according to the present invention, the position of the light source also is supported in such a manner as to be freely adjusted in the optical axis adjusting direction. The position of the light source also is adjusted in the optical axis adjusting direction in such a manner as to maximize an amount of the light incident into the mirror box 30 after the optical axis adjustment with respect to the mirror box 30 and the film carrier 32. Otherwise, the light source can be supported by the supporting/positioning plate 100 together with the mirror box 30 and the film carrier 32. With such configuration, the mirror box 30, the film carrier 32 and the light source can be respectively positioned at required accuracy. Furthermore, it is possible to suppress relative displacement of any one of the mirror box 30, the film carrier 32 and the light source disposed in the supporting/positioning plate 100 from the other members.

Next, explanation will be made below on the operation and function of the image reading apparatus in the preferred embodiment in order to attain the second object according to the present invention. First, explanation will be made on the case where the film carrier 32 exclusively for use in the photographic film of a 135 size is disposed in the film carrier supporting portion 112 in the state in which the mirror box 30 exclusively for use in the photographic film of a 135 size is fixed to the apparatus body, i.e., the case where the mirror box 30 is correctly combined with the film carrier 32. In disposing the film carrier 32 in the carrier supporting portion 112, the film carrier 32 is slid along the guide rails 170 in the disposing direction, as described already. At this moment, the upper end of the mirror box 30 is inserted into the groove 110 to be inserted without any contact with the film carrier 32. When the film carrier 32 is slid to the disposing direction, it is stopped by the stopper (not shown).

As shown in FIG. 16, in the film carrier 32 positioned at the disposing position, the opening of the base 100 serving as the light incident port into the carrier faces to the light diffusing plate 30B of the mirror box 30, and further, the center of the opening accords with the optical axis L of the reading light to be emitted from the light diffusing plate 30B. At this time, the mirror box 30 and the slide plate 144 are held at the reference fixing position by the coil spring 160, and the micro switch 138 is kept in the ON state.

In contrast, explanation will be made on the case where the film carrier 92 exclusively for use in the photographic film of a 240 size is disposed in the film carrier supporting portion 112 in the state in which the mirror box 30 exclusively for use in the photographic film of a 135 size is fixed to the apparatus body, i.e., the case where the mirror box 30 is incorrectly combined with the film carrier 92. As described already, the groove 122 to be inserted of the film carrier 92 is shorter than the groove 110 to be inserted of the film carrier 32 in the attaching/detaching direction, and further, is deeper in the axial direction of the optical axis L. The upper end of the mirror box 30 exclusively for use in the photographic film of a 135 size is formed longer than that of the mirror box 90 exclusively for use in the photographic film of a 240 size. Therefore, when the film carrier 92 is slid along the guide rails 170 in the disposing direction, the upper end of the mirror box 30 is inserted into the groove 110 to be inserted without any contact with the side surface of the film carrier 32 having the opening end of the groove 110 formed thereat. However, the side surface of the mirror box 30 abuts against the inner wall on the side of the closing end of the groove 110 to be inserted immediately before the film carrier 32 reaches the disposing position, thereby pressurizing the mirror box 30 in the disposing direction. Thus, the slide plate 144, which receives pressing force from the film carrier 32 via the mirror box 30, is slid in the disposing direction against the urging force of the coil spring 160, as shown in FIG. 17, and then, the striker 166 of the slide plate 144 is separated from the actuator 140, to thus change over the micro switch 138 from the ON state to the OFF state.

An illustration will be omitted of the case where the film carrier 96 exclusively for use in the photographic film of a 120 size is disposed in the film carrier supporting portion 112 in the state in which the mirror box 30 exclusively for use in the photographic film of a 135 size is fixed to the apparatus body. The groove 128 to be inserted of the film carrier 96 is formed shallower than the groove 110 of the film carrier 32 in the axial direction of the optical axis L. At the upper end of the mirror box 30 exclusively for use in the photographic film of a 135 size, the length projecting from the film carrier supporting portion 112 is formed greater than that of the mirror box 94 exclusively for use in the photographic film of a 120 size in the axial direction of the optical axis L. Therefore, when the film carrier 92 is slid along the guide rails 170 in the disposing direction, the upper end of the mirror box 30 abuts against the side surface of the film carrier 32 having the opening end of the groove 110 formed thereat, thereby pressurizing the mirror box 30 in the disposing direction. Thus, the slide plate 144, which receives the pressurizing force from the film carrier 32 via the mirror box 30, is slid in the disposing direction against the urging force of the coil spring 160, like the case shown in FIG. 17, and then, the striker 166 of the slide plate 144 is separated from the actuator 140, to thus change over the micro switch 138 from the ON state to the OFF state.

Since an alarm message or sound is generated if the micro switch 138 is turned off during disposing the film carrier 32, 92 or 96, an operator can readily confirm the incorrect combination of the mirror box and the film carrier. Thereafter, when the operator draws the film carrier 32, 92 or 96 from the film carrier supporting portion 112, the mirror box 30, 90 or 94 is slid by the urging force of the coil spring 160. At this time, one end of at least one guide pin 150 or 152 constituting the stopper member and one end of the guide slit 134 in the detaching direction abut against each other, thereby stopping the mirror box 30, 90 or 94 at the reference fixing position.

In the case where the mirror box 90 or 94 other than the mirror box 30 is installed in the apparatus body, when the film carrier 32, 92 or 96 corresponding to the type of photographic film different from the type of photographic film for which the fixed mirror box 90 or 94 is suited is to be disposed in the film carrier supporting portion 112, the mirror box 90 or 94 and the film carrier 32, 92 or 96 abut against each other during the disposing operation, whereby the micro switch 138 is changed from the ON state to the OFF state.

As described above, in the image reading apparatus in the preferred embodiment in order to attain the second object according to the present invention, in the case where the film carrier 32, 92 or 96 and the mirror box 30, 90 or 94 correspond to the different type of photographic film, i.e., in the case where the film carrier and the optical waveguide is combined incorrectly, the fixing mechanism comprising the support plate 130, the slide plate 144, the coil spring 160 and the attaching/detaching plate 162 moves the mirror box 30, 90 or 94 in the disposing direction by the pressurizing force from the film carrier 32, 92 or 96 to be disposed in the film carrier supporting portion 112, so it is possible to prevent any breakage of the film carrier 32, 92 or 96, the mirror box 30, 90 or 94 and the members receiving a load via the film carrier or the mirror box since a load higher than a spring constant of the coil spring 160 cannot act on the apparatus even if the film carrier 32, 92 or 96 to be disposed in the film carrier supporting portion 112 abuts against the mirror box.

Moreover, in the case where the combination of the film carrier and the optical waveguide is incorrect, the micro switch 138 detects that the mirror box 30, 90 or 94 is moved in the disposing direction by the pressurizing force from the film carrier 32, 92 or 96 to be disposed in the film carrier supporting portion 112, so that the operator can be securely informed of the incorrect combination of the film carrier and the mirror box by an alarm message or sound during disposing of the film carrier 32, 92 or 96 in the film carrier supporting portion 112.

In the above-described image reading apparatus in the preferred embodiment in order to attain the second object according to the present invention, the description has been given of only the configuration in which the fixing mechanism comprising the support plate 130, the slide plate 144, the coil spring 160 and the attaching/detaching plate 162 allows the mirror box 30, 90 or 94 to be slid in the direction where the film carrier 32, 92 or 96 is disposed in the film carrier supporting portion 112, i.e., in the retracting direction in the case of the incorrect combination of the film carrier and the mirror box. However, the retracting direction is not limited to the disposing direction. For example, the mirror box 30, 90 or 94 may be supported oscillatably, so that the upper end of the mirror box 30, 90 or 94 maybe oscillated in a direction separated from the film carrier 32, 92 or 96 in the case of the incorrect combination of the film carrier and the mirror box.

As described above, in the image reading apparatus according to the present invention, first, it is possible to reduce the frequency required for the optical axis adjusting operation of the optical waveguide and the film carrier with respect to the optical axis in the image forming optical system, and to simplify the optical axis adjusting operation of the optical waveguide and the film carrier.

Second, in the image reading apparatus according to the present invention, it is possible to prevent any breakage of the apparatus in the case of the incorrect combination of the previously disposed optical waveguide and the film carrier to be disposed in the film carrier supporting portion, and further, to inform the operator of the incorrect combination of the previously disposed optical waveguide and the film carrier to be disposed in the film carrier supporting portion.

What is claimed is:

1. An image reading apparatus comprising:
   a light source for irradiating light onto a photographic photosensitive material;
   an image forming optical system for forming reflected or transmitted light from the photographic photosensitive material into an image;
   a film carrier for supporting the photographic material loaded from the outside;
   an optical waveguide for guiding the light, which is incident on an incident light portion from said light source, to a light emitting portion, and irradiating the light from said light emitting portion onto the photographic photosensitive material supported by said film carrier in such a manner that the reflected or transmitted light from the photographic photosensitive material is incident on said image forming optical system; and
   a supporting/positioning member interposed between said light source and said image forming optical system, for supporting said film carrier and said optical waveguide; and
   wherein the image reading apparatus further comprises movable supporting means for supporting said supporting/positioning member in such a manner that the position of said supporting/positioning member is adjustable in a direction perpendicular to the optical axis of said image forming optical system.

2. An image reading apparatus according to claim 1, wherein said optical waveguide and said film carrier are detachably attached to said supporting/positioning member.

3. An image reading apparatus according to claim 1, wherein said optical waveguide is formed as a cylindrical body having an inner wall serving as a mirror surface, and said optical waveguide comprises a first light diffusing plate disposed at an opening at one end of the cylindrical member and a second light diffusing plate disposed at the other end of the cylindrical member.

4. An image reading apparatus according to claim 1, wherein said movable supporting means comprises a supporting/positioning plate, and fixing means for fixing said supporting/positioning plate to slide supporters of a base frame.

5. An image reading apparatus according to claim 4, wherein said supporting/positioning plate includes sliders for allowing said film carrier to be moved slidably.

6. An image reading apparatus according to claim 5, wherein said film carrier includes, at positions corresponding to said sliders of said supporting/positioning plate, a pair of guide projections extending in the direction in which the carrier is attached and detached.

7. An image reading apparatus according to claim 6, wherein said supporting/positioning plate includes a pair of guide rails to be engaged with said pair of guide projections formed at said film carrier so as to guide said film carrier on said supporting/positioning plate, and rotary support members for supporting said film carrier.

8. An image reading apparatus according to claim 7, wherein said supporting/positioning plate includes a pair of guide rails for guiding said film carrier and rotary support members for supporting said film carrier along said guide rails.

9. An image reading apparatus according to claim 2, wherein said film carrier includes, at positions corresponding to said supporting/positioning plate, a pair of guide projections extending in the direction in which the carrier is attached and detached.

10. The image reading apparatus according to claim 1, wherein light irradiated from the light source passes through an opening in the support/positioning member that contains the optical waveguide.

11. The image reading apparatus according to claim 1, wherein the supporting positioning member is movable relative to an optical axis of the optical waveguide so as to integrally move both the optical waveguide and the film carrier relative to the optical axis.

12. An image reading apparatus capable of reading images from a plurality of types of photographic films, said image reading apparatus comprising:
   a film carrier, having a shape corresponding to the type of photographic film, for holding the photographic film;
   a film carrier supporting portion, in which said film carrier is detachably mounted, for positioning the photographic film held by said film carrier at a predetermined reading position;
   an optical waveguide being replaceably attached to a predetermined reference attachment position and having a shape corresponding to the type of photographic film, for irradiating light emitted from a light source onto the reading position; and
   a retracting mechanism for moving said optical waveguide from the reference attachment position by the pressing force of said film carrier mounted in said film carrier supporting portion in the case where the shapes of said film carrier and said optical waveguide each correspond to a different type of photographic film.

13. An image reading apparatus according to claim 12, wherein said retracting mechanism comprises:
   an urging member for urging said optical waveguide moved by the pressing force of said film carrier in the direction of the reference attachment position; and
   a stopper member for stopping said optical waveguide moved by urging force of said urging member at the reference attachment position when said film carrier is detached from said film carrier supporting portion.

14. An image reading apparatus according to claim 12, further comprising a retraction detecting mechanism for detecting that said optical waveguide is moved by the pressing force of said film carrier.

15. An image reading apparatus according to claim 14, wherein said retraction detecting mechanism comprises:

said urging member;

a slide member movable against the urging force of said urging member; and a micro switch to be actuated by a pressing member disposed in said slide member.

16. An image reading apparatus according to claim 12, wherein said film carrier is adapted to contain therein at least one type of film selected from the group consisting of a film of 135 size, a film of 120 size, a film of 240 size, a film of 220 size, and a film of 110 size.

17. An image reading apparatus according to claim 13, wherein said film carrier is adapted to contain therein at least one type of film selected from the group consisting of a film of 135 size, a film of 120 size, a film of 240 size, a film of 220 size, and a film of 110 size.

18. An image reading apparatus according to claim 14, wherein said film carrier is adapted to contain therein at least one type of film selected from the group consisting of a film of 135 size, a film of 120 size, a film of 240 size, a film of 220 size, and a film of 110 size.

19. An image reading apparatus according to claim 15, wherein said film carrier is adapted to contain therein at least one type of film selected from the group consisting of a film of 135 size, a film of 120 size, a film of 240 size, a film of 220 size, and a film of 110 size.

20. An image reading apparatus comprising:

a light source for irradiating light onto a photographic photosensitive material;

an image forming optical system for forming reflected or transmitted light from the photographic photosensitive material into an image;

a film carrier for supporting the photographic material loaded from the outside;

an optical waveguide for guiding the light, which is incident on an incident light portion from said light source, to a light emitting portion, and irradiating the light from said light emitting portion onto the photographic photosensitive material supported by said film carrier in such a manner that the reflected or transmitted light from the photographic photosensitive material is incident on said image forming optical system; and a supporting/positioning member interposed between said light source and said image forming optical system, for supporting said film carrier and said optical waveguide; and wherein the image reading apparatus further comprises a movable support that supports said support/positioning member so that said support/positioning member adjusts in a direction perpendicular to an optical axis of said image forming optical system.

21. An image reading apparatus comprising:

a photographic material having an image;

a film carrier that supports the photographic material;

a light source that irradiates light;

an optical waveguide that guides the irradiated light from the light source to the photographic material supported by the film carrier, such that the irradiated light is reflected from or transmitted through the photographic material;

an optical system that receives the irradiated light reflected from or transmitted through the photographic material and converts the reflected or transmitted light into an electrical signal corresponding to the image;

a supporting/positioning member interposed between the light source and the optical system, the supporting/positioning member supports the film carrier and the optical waveguide; and a movable support that supports the support/positioning member so that the support/positioning member adjusts in a direction perpendicular to an optical axis of the optical system.

22. The image reading apparatus according to claim 21, wherein the light source, film carrier, and optical wave guide are substantially aligned along the same axis.

23. The image reading apparatus according to claim 21, wherein the movable support supports the support/positioning member so that the optical waveguide adjusts in a direction perpendicular to an optical axis of the optical system and relative to the film carrier.

24. The image reading apparatus according to claim 21, wherein the photographic material is a negative film or a reversal film.

25. The image reading apparatus according to claim 21, wherein light irradiated from the light source passes through an opening in the support/positioning member that contains the optical waveguide.

26. The image reading apparatus according to claim 21, wherein the supporting positioning member is movable relative to an optical axis of the optical waveguide so as to integrally move both the optical waveguide and the film carrier relative to the optical axis.

* * * * *